US012566362B2

(12) United States Patent
Abe et al.

(10) Patent No.: US 12,566,362 B2
(45) Date of Patent: Mar. 3, 2026

(54) SURVEILLANCE CAMERA

(71) Applicant: i-PRO CO., LTD., Tokyo (JP)

(72) Inventors: Koji Abe, Fukuoka (JP); Fumihiro Arase, Fukuoka (JP)

(73) Assignee: I-PRO CO., LTD., Tokyo (JP)

( * ) Notice: Subject to any disclaimer, the term of this patent is extended or adjusted under 35 U.S.C. 154(b) by 121 days.

(21) Appl. No.: 18/618,418

(22) Filed: Mar. 27, 2024

(65) Prior Publication Data

US 2024/0329499 A1 Oct. 3, 2024

(30) Foreign Application Priority Data

Mar. 31, 2023 (JP) ................................. 2023-058027

(51) Int. Cl.
*G03B 17/56* (2021.01)
*G03B 17/55* (2021.01)
(52) U.S. Cl.
CPC ........... *G03B 17/561* (2013.01); *G03B 17/55* (2013.01)

(58) Field of Classification Search
CPC .............................. G03B 17/561; G03B 17/55
See application file for complete search history.

(56) References Cited

U.S. PATENT DOCUMENTS

2018/0356710 A1* 12/2018 Bingleman ............ G03B 17/55

FOREIGN PATENT DOCUMENTS

JP 2021-36293 A 3/2021
WO WO-2021034681 A1 * 2/2021 ............. G03B 30/00

* cited by examiner

*Primary Examiner* — Minh Q Phan
(74) *Attorney, Agent, or Firm* — Greenblum & Bernstein, P.L.C.

(57) ABSTRACT

A surveillance camera includes a camera unit, a camera case including the camera unit therein, and a rotation seat rotatably connecting the camera case. The camera case includes a substrate holding portion formed of metal. On an inner side surface of the substrate holding portion, a first substrate on which an electronic component that processes data transmitted from the camera unit is mounted is arranged. On an outer side surface of the substrate holding portion, a heat dissipating portion is formed.

10 Claims, 25 Drawing Sheets

SURVEILLANCE CAMERA

CROSS-REFERENCE TO RELATED APPLICATIONS

This application is based on and claims priority under 35 USC 119 from Japanese Patent Application No. 2023-058027 filed on Mar. 31, 2023, the contents of which are incorporated herein by reference.

TECHNICAL FIELD

The present disclosure relates to a surveillance camera.

BACKGROUND ART

As an example of a surveillance camera, there is disclosed an imaging apparatus including a dome cover, a body substrate, a base portion supporting the body substrate, a first lens cover disposed on a lens side of a lens unit, that is, on a dome cover side, a second lens cover disposed on an imaging element side opposite to a lens of the lens unit, that is, on a body substrate side relative to the first lens cover, a sensor substrate having an imaging element, and a heat transfer member in contact with the sensor substrate and the first lens cover. The first lens cover is made of metal, and the second lens cover is made of resin.

CITATION LIST

Patent Literature

Patent Literature 1: JP2021-36293A

SUMMARY OF INVENTION

In the surveillance camera of Patent Literature 1 described above, heat generated from electrical components mounted on the body substrate is transferred to the base portion. However, when the base portion is fixed to a ceiling, a wall, or the like, heat dissipation to the atmosphere may significantly decrease and heat dissipation efficiency may deteriorate. In addition, the heat is transferred to the entire base portion, and thus a component adjacent to the base portion may be unintentionally thermally damaged.

The present disclosure is proposed in view of the above mentioned circumstances in the related art, and an object thereof is to provide a surveillance camera that can properly dissipate heat to outside even when a substrate generates heat.

The present disclosure provides a surveillance camera. The surveillance camera includes a camera unit, a camera case in which the camera unit is mounted, and a rotation seat rotatably connecting the camera case. The camera case includes a substrate holding portion formed of metal. On an inner side surface of the substrate holding portion, a first substrate on which an electronic component that processes data transmitted from the camera unit is mounted is arranged. On an outer side surface of the substrate holding portion, a heat dissipating portion is formed.

According to the present disclosure, heat can be properly dissipated to outside even when a substrate generates heat.

BRIEF DESCRIPTION OF DRAWINGS

FIG. 17 is an enlarged view of a main portion of FIG. 16;

FIG. 18 is an external view in which the rotation seat and the camera case viewed from a direction E in FIG. 15 are reversed upside down;

DESCRIPTION OF EMBODIMENTS

Hereinafter, embodiments that specifically disclose a surveillance camera according to the present disclosure will be described in detail with reference to the drawings as appropriate. Detailed description more than necessary may be omitted. For example, detailed description of already well-known matters and redundant description of substantially the same configuration may be omitted. This is to avoid redundancy of the following description and facilitate understanding of a person skilled in the art. The accompanying drawings and the following description are provided for a person skilled in the art to sufficiently understand the present disclosure, and are not intended to limit the subject matter described in the claims.

Background to First Embodiment

For example, JP5853181B discloses an attachment structure for a surveillance camera, which attaches a camera case to a camera attachment space in a central portion of a bracket formed in an annular shape. In the camera attachment space, a plurality of camera fixing sheet metal portions each having a keyhole are formed at equal intervals along a circumferential direction. The camera case is provided with, on an upper surface thereof, protruding engagement pins each having a large-diameter head portion to be engaged with the keyholes of the camera fixing metal plate portions. In a surveillance camera having such an attachment structure, when the camera case is inserted into the camera attachment space and rotated, the engaging pins are engaged with the keyholes, and the camera case is supported and restricted from falling.

In the above described surveillance camera in the related art, falling can be restricted when the engagement pins are engaged with the keyholes of the bracket. However, there may be slight looseness in engagement directions (for example, in up-down and left-right directions), and a camera case of a surveillance camera installed in an outdoor environment may rattle in the up-down and left-right directions due to wind pressure or vibration in the outdoor environment.

A first embodiment below describes an example of a surveillance camera that can prevent rattling of a camera case even when installed in an outdoor environment.

Figure 1:
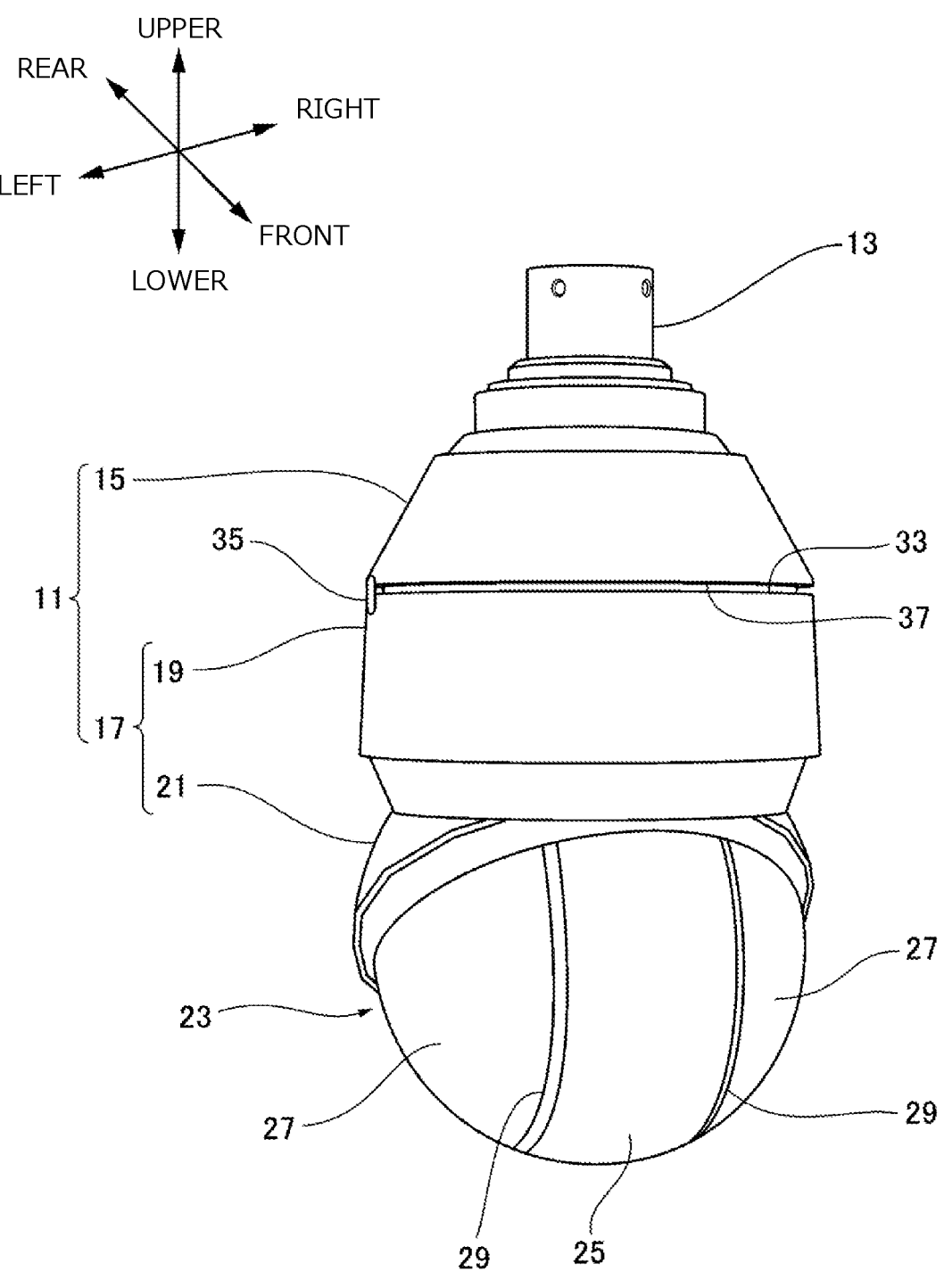
FIG. 1 is an external front view of a surveillance camera according to a first embodiment.

In description of following embodiments, up-down, left-right, and front-rear directions of an appearance of a surveillance camera according to each embodiment follow directions shown in FIG. 1.

First Embodiment

FIG. 1 is an external front view of a surveillance camera 11 according to a first embodiment. The surveillance camera 11 includes a bracket 15 fixed to a support pipe 13 or the like, and a main case 17 including a camera unit and suspended and supported by the bracket 15. The main case 17 includes a rotation seat 19 fixed to the bracket 15 in a suspended state, and a camera case 21 rotatable relative to the rotation seat 19 and supported in a suspended state. The surveillance camera 11 further includes a dome-shaped cover 23 fixed to the camera case 21. The cover 23 includes an imaging window portion 25 at a center and left and right light projecting window portions 27 having the imaging window portion 25 sandwiched in between. The imaging window portion 25 and the light projecting window portions 27 are connected by coupling bodies 29.

The support pipe 13 is fixed to, for example, a ceiling, a wall, or a pole. The bracket 15 is formed in a conical shape, for example. In addition, the bracket 15 may be a support fitting that has a locking structure for locking to the rotation seat 19 on a lower surface and is fixed to a pole, a wall, or the like. The rotation seat 19 supported by the bracket 15 has a cylindrical outer shape having a diameter substantially equal to a diameter of a bottom surface of a conical portion of the bracket 15.

Figure 2:
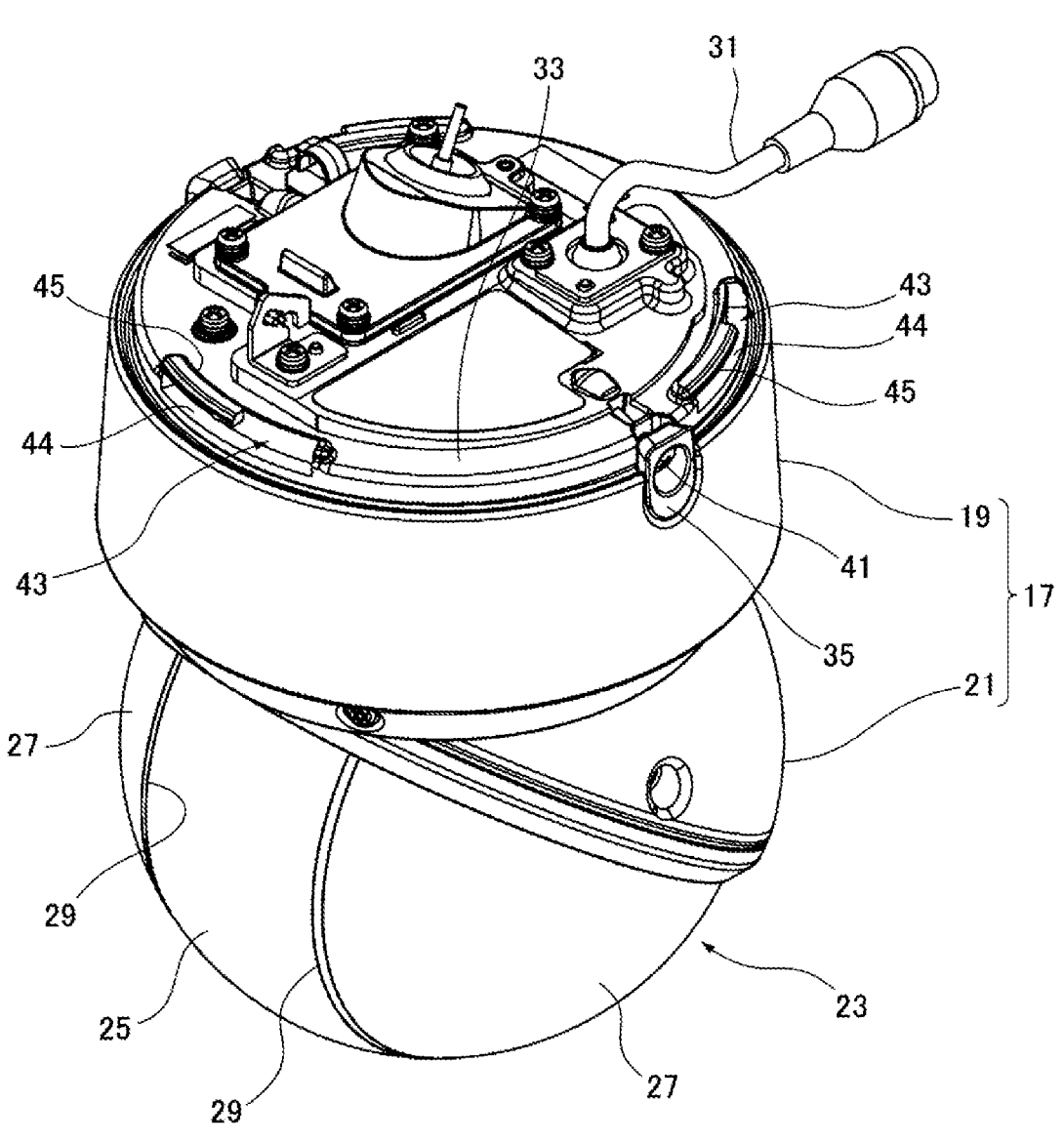
FIG. 2 is a perspective view of a camera case with a bracket omitted.

FIG. 2 is a perspective view of the camera case 21 with the bracket 15 omitted. The main case 17 is attachably and detachably supported to the bracket 15 by a locking structure. When the rotation seat 19 of the main case 17 is attached to and detached from the bracket 15, a part of the locking structure that is attachable to and detachable from the bracket 15, a cable 31 drawn out to outside from the bracket 15, and the like are exposed to an upper end surface 33. The upper end surface 33 has at least a drip prevention structure, more preferably a waterproof structure.

Figure 3:
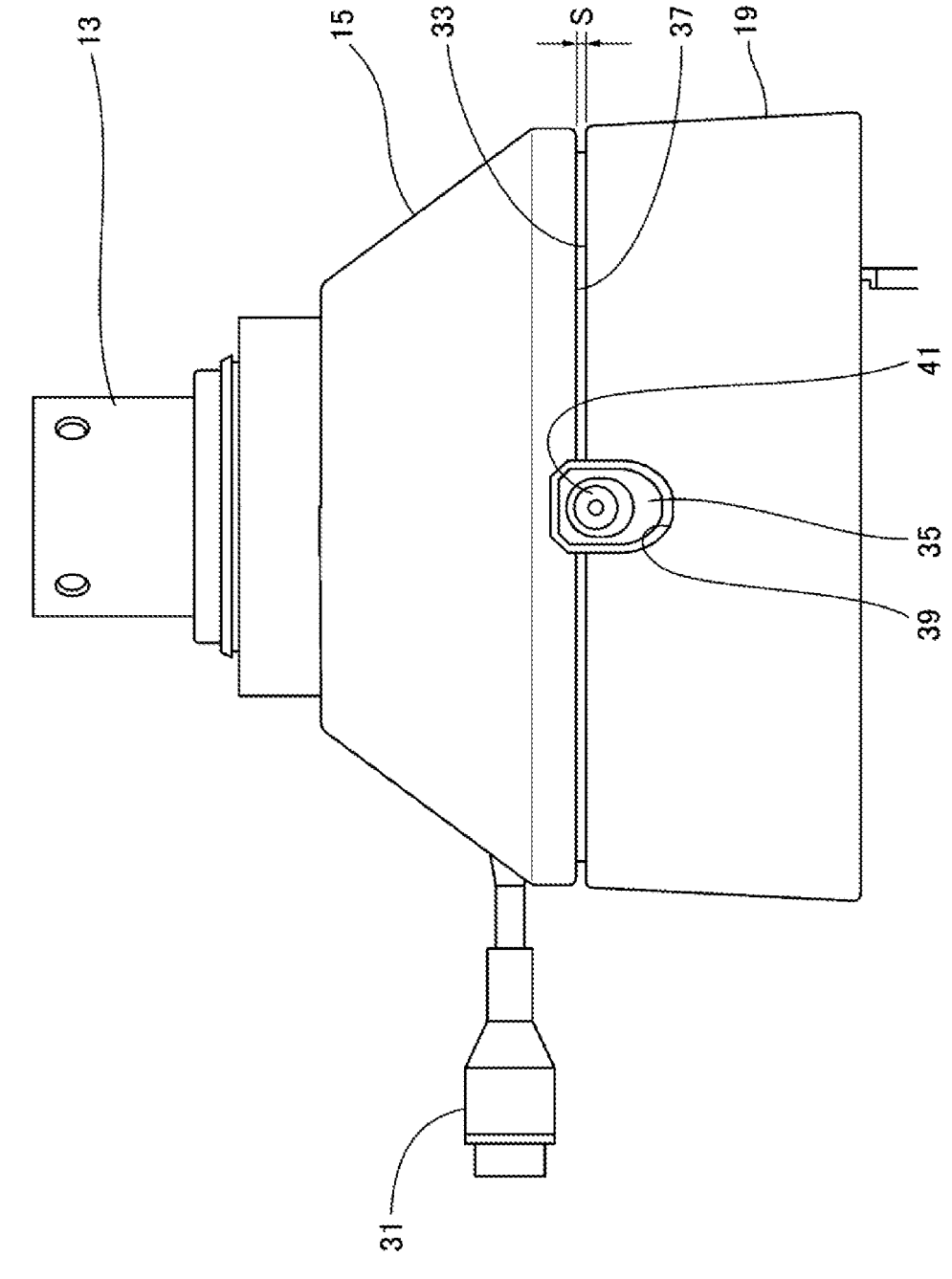
FIG. 3 is a front view of a bracket and a rotation seat.

FIG. 3 is a front view of the bracket 15 and the rotation seat 19. The surveillance camera 11 includes a fixing member 35 interposed between the bracket 15 and the rotation seat 19 of the main case 17. The fixing member 35 presses and fixes a lower end surface 37 of the bracket 15 and the upper end surface 33 of the rotation seat 19. The lower end surface 37 and the upper end surface 33 that are pressed may be portions thereof (for example, peripheral edges). A plurality of fixing members 35 may be arranged at equal intervals in a circumferential direction of each of the bracket 15 and the rotation seat 19. Specifically, in the surveillance camera 11, the fixing member 35 is inserted into a recess 39 formed across the bracket 15 and the rotation seat 19. The recess 39 is provided at intervals of 180° along the circumferential direction of the rotation seat 19. That is, the recess 39 is provided in two positions on a peripheral edge of the rotation seat 19. The fixing member 35 inserted into the recess 39 is fastened to the rotation seat 19 by a screw member 41. Accordingly, an inner surface of the recess 39 is pressed by the fastened fixing member 35. Two or more fixing members 35 may be disposed along the circumferential direction of the rotation seat 19. For example, the recess 39 and the fixing member 35 may be provided at intervals of 90° along the circumferential direction of the rotation seat 19.

Figure 4:
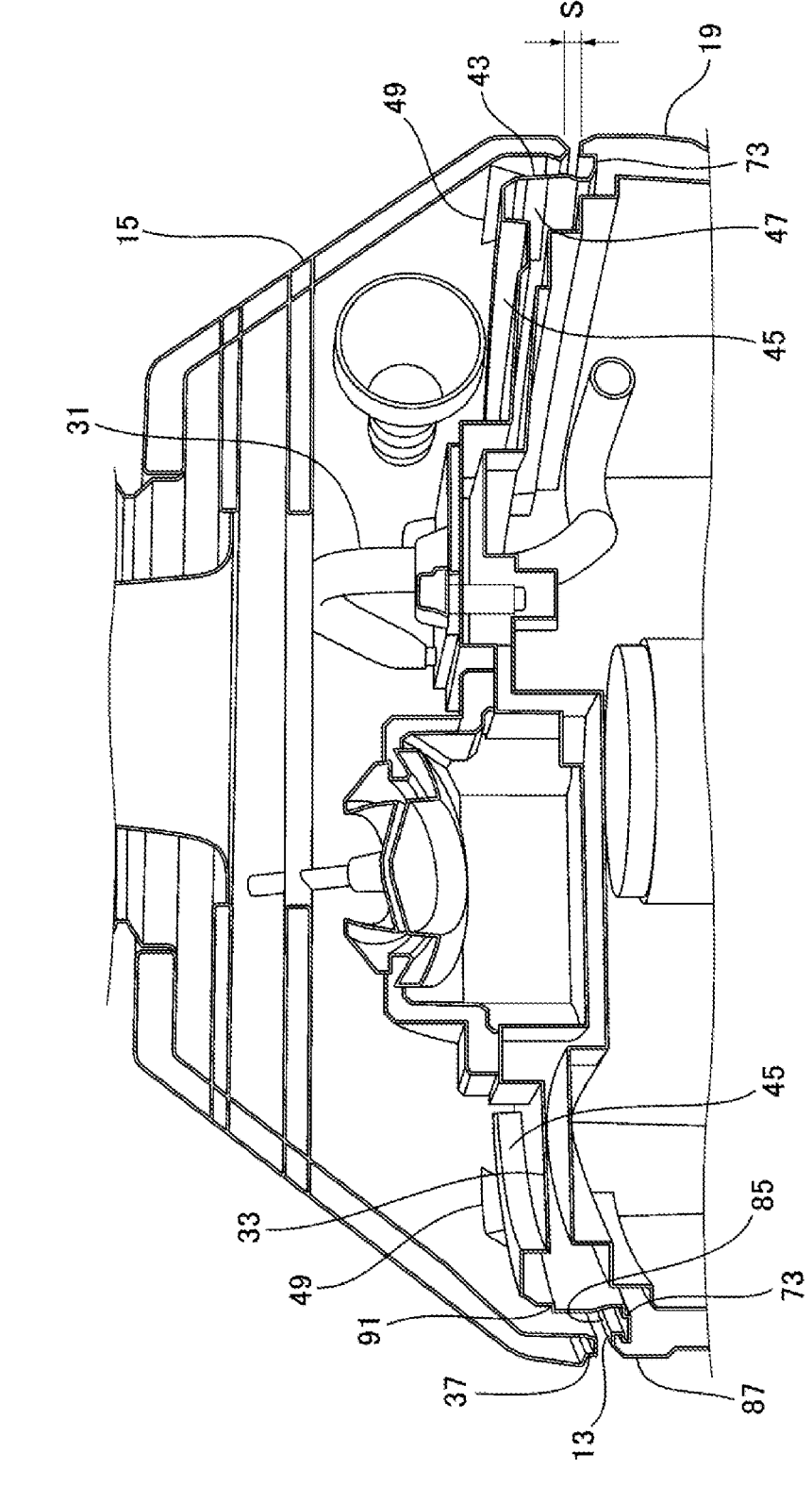
FIG. 4 is a longitudinal sectional view of a main portion of the bracket and the rotation seat.

FIG. 4 is a longitudinal sectional view of a main portion of the bracket 15 and the rotation seat 19. A gap S is provided between the lower end surface 37 of the bracket 15 and the upper end surface 33 of the rotation seat 19 in the up-down direction. A distance of the gap S is, for example, about several millimeters. The gap S is provided over an entire circumference of a joint boundary between the bracket 15 and the rotation seat 19.

The rotation seat 19 of the main case 17 includes a locking portion on an outer peripheral side of the upper end surface 33. On the other hand, the bracket 15 includes a locked portion that is locked to the locking portion of the rotation seat 19. A plurality of locking structures each including the locking portion and the locked portion are provided at equal intervals along the circumferential direction on the lower end surface 37 of the bracket 15 and the upper end surface 33 of the rotation seat 19. For example, the surveillance camera 11 is provided with three locking structures, and the number is not limited to three.

A specific example of the locking structure will be described with reference to FIGS. 2 and 4.

As shown in FIG. 2, the upper end surface 33 of the rotation seat 19 has an arc-shaped groove 43 that opens to an upper side and an outer peripheral surface side. The arc-shaped groove 43 extends along a part of the upper end surface 33 in the circumferential direction. The upper end surface 33 has an arc-shaped locking portion 45 extending from an outer peripheral end portion of the upper end surface 33 toward an outer peripheral side of the rotation seat 19. The arc-shaped locking portion 45 is adjacent to the arc-shaped groove 43. The arc-shaped locking portion 45 has a locking groove 44 in a lower portion thereof, which communicates with the arc-shaped groove 43.

On the other hand, as shown in FIG. 4, the bracket 15 includes an arc-shaped projecting piece 47 projecting inward from an inner peripheral surface. The bracket 15 further includes an arc-shaped abutment portion 49 above the arc-shaped projecting piece 47. The arc-shaped projecting piece 47 is inserted into the arc-shaped groove 43 and is guided to the locking groove 44 when the surveillance camera 11 rotates in the circumferential direction. When a lower surface of the arc-shaped locking portion 45 abuts against an upper surface of the arc-shaped projecting piece 47, the surveillance camera 11 can be locked to the bracket 15. A lower surface of the arc-shaped abutment portion 49 can abut against an upper surface of the arc-shaped locking portion 45, and thus large rattling of the surveillance camera 11 in the up-down direction in a state of being locked to the bracket 15 can be prevented. The arc-shaped groove 43, the locking groove 44, and the arc-shaped locking portion 45 constitute the locking portion of the rotation seat 19. The arc-shaped projecting piece 47 and the arc-shaped abutment portion 49 constitute the locked portion of the bracket 15.

In the locking structure including the locking portion and the locked portion, to lock the rotation seat 19 to the bracket 15, the upper end surface 33 of the rotation seat 19 is rotated while abutting in parallel against the lower end surface 37 of the bracket 15. Accordingly, a plurality of locking portions provided on the upper end surface 33 of the rotation seat 19 are locked to respective locked portions provided on the lower end surface 37 of the bracket 15, and the rotation seat 19 is supported by the bracket 15 and is restricted from falling. Structures of the locking portion and the locked portion are not limited to shapes of the arc-shaped groove 43, the locking groove 44, and the arc-shaped locking portion 45 as long as the surveillance camera 11 can be locked to the bracket 15.

Figure 5:
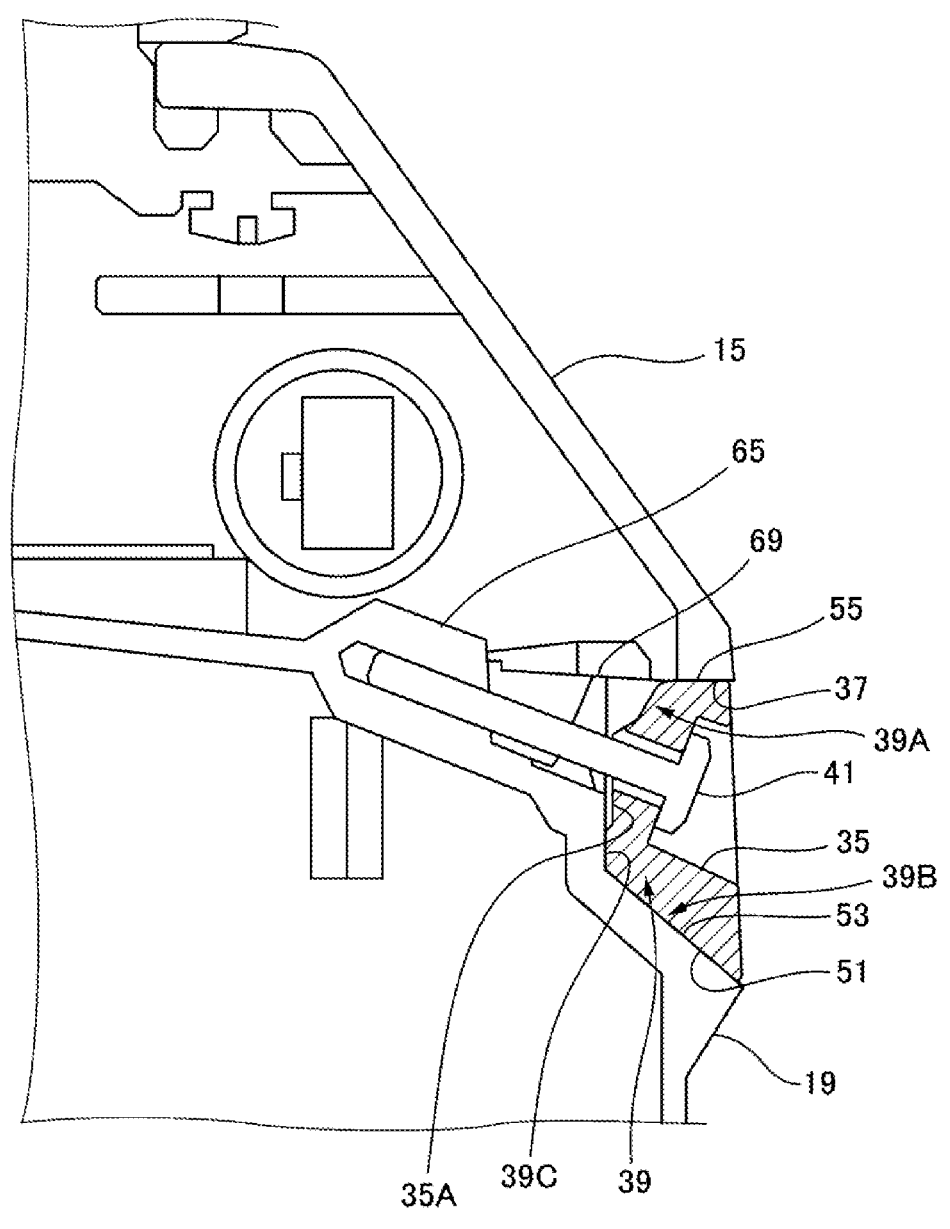
FIG. 5 is a longitudinal sectional view of a main portion of the surveillance camera showing a structure in a vicinity of a fixing member screwed into the rotation seat.

FIG. 5 is a longitudinal sectional view of a main portion of the surveillance camera 11 showing a structure in a vicinity of the fixing member 35 screwed into the rotation seat 19. In the surveillance camera 11, the recess 39 is formed across the bracket 15 and the rotation seat 19. More specifically, the recess 39 is formed by up-and-down coupling a recess 39A opening downward on an outer peripheral surface of the bracket 15 and a recess 39B opening upward on an outer peripheral surface of the rotation seat 19. The fixing member 35 is inserted into the recess 39. The fixing member 35 inserted into the recess 39 is fastened to the rotation seat 19 by a screw member 41. The fixing member 35 has a pressing portion that presses the rotation seat 19 and the bracket 15 in a direction of separating the rotation seat 19 and the bracket 15. The pressing portion is constituted by upper, lower, left, and right outer peripheral surfaces of the fixing member 35 as described later.

A lower portion of the pressing portion of the fixing member 35 serves as a first inclined surface 51 inclined from an outer side surface toward an inner side surface of the rotation seat 19. The recess 39B of the rotation seat 19 has, on a bottom surface thereof, a second inclined surface 53 that abuts against the first inclined surface 51. An upper surface of the pressing portion of the fixing member 35 serves as an abutment portion 55 that abuts against an upper surface of the recess 39A of the bracket 15. As shown in FIG. 3, the fixing member 35 has an outer shape in which an upper portion thereof is rectangular in a front view and a lower portion thereof is semicircular. As shown in FIG. 5, the fixing member 35 has a tapered shape (that is, a wedge shape) toward an insertion direction into the recess 39 due to the first inclined surface 51 and the abutment portion 55.

Figure 6:
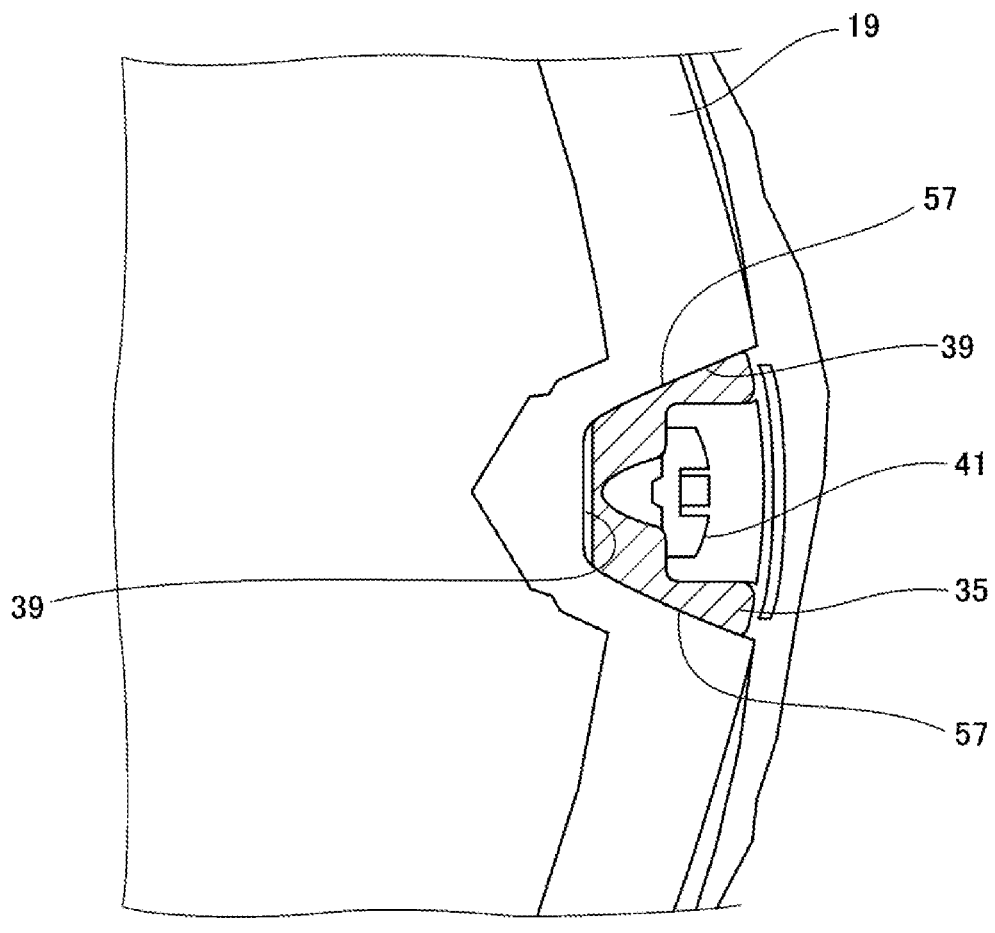
FIG. 6 is a cross sectional view of a main portion of the surveillance camera showing a structure in a vicinity of the fixing member screwed into the rotation seat.

FIG. 6 is a cross-sectional view of a main portion of the surveillance camera 11 showing a structure in a vicinity of the fixing member 35 screwed into the rotation seat 19. The fixing member 35 has a tapered shape in the insertion direction into the recess 39 even in a cross section. Here, when the fixing member 35 is screwed, the first inclined surface 51 and the abutment portion 55 shown in FIG. 5 and two left and right tapered surfaces 57 and 57 shown in FIG. 6 abut against an inner side surface of the recess 39. That is, the left and right tapered surfaces 57 and 57 are formed across a side surface of the recess 39A of the bracket 15 and a side surface of the recess 39B of the rotation seat 19. On the other hand, an insertion top end surface of the fixing member 35 does not abut against a back surface 39C of the recess 39. That is, the fixing member 35 is fastened to the recess 39 with a slight gap between the insertion top end surface and the back surface 39C of the recess 39. The gap serves as a drain channel for rainwater or the like described later. As a material of the fixing member 35, for example, a resin material or hard rubber can be used.

Figure 7:
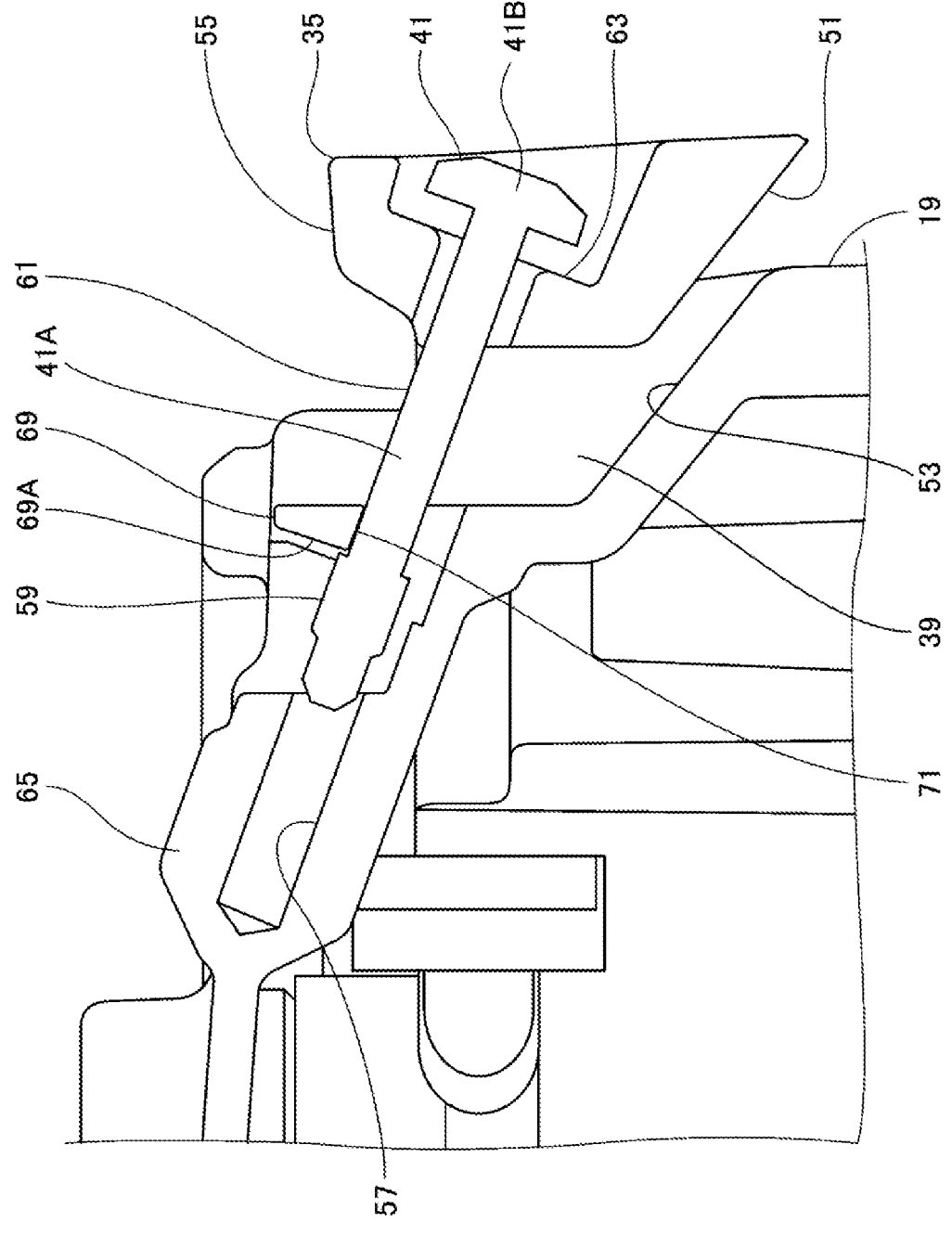
FIG. 7 is a longitudinal sectional view of a main portion showing a state in which a screw member is caught and held by the rotation seat.

FIG. 7 is a longitudinal sectional view of a main portion showing a state in which the screw member 41 is held by the rotation seat 19. The screw member 41 includes a rod-shaped shaft portion 41A and a head portion 41B formed on one end side of the shaft portion 41A. The shaft portion 41A has, on the other end side thereof, a large diameter portion having a diameter larger than a diameter of the shaft portion 41A, and a male screw portion 59 on an outer periphery of the large diameter portion. In the screw member 41, a neck portion 61 between the male screw portion 59 and the head portion 41B of the screw member 41 has a smaller diameter than the male screw portion 59. In the screw member 41, the male screw portion 59 and the neck portion 61 penetrate the fixing member 35 (see FIG. 5), and the head portion 41B abuts on a seating surface 63 of the fixing member 35. The screw member 41 fastens the fixing member 35 into the recess 39 by screwing the male screw portion 59 into a female screw 67 formed in a fixing portion 65 of the rotation seat 19.

The rotation seat 19 includes a protruding portion 69 on an outer peripheral side relative to the fixing portion 65. The protruding portion 69 has a female screw hole 71 into which the male screw portion 59 is screwed. A space is provided between the protruding portion 69 and the fixing portion 65. The space is set to be larger than an entire length of the male screw portion 59. Accordingly, in the screw member 41 that is unscrewed from the fixing portion 65, the male screw portion 59 is caught by a side surface 69A of the protruding portion 69 on a fixing portion side, and removal of the screw member 41 from the protruding portion 69 is restricted and the screw member 41 can be locked to the protruding portion 69.

Even when the screw member 41 is unscrewed from the fixing portion 65, the fixing member 35 penetrated by the screw member 41 would not be detached from the rotation seat 19 but be prevented from being lost since the screw member 41 is locked to the protruding portion 69. The male screw portion 59 of the screw member 41 can pass through the female screw hole 71 by rotation. Accordingly, the screw member 41 can be detached from the rotation seat 19 together with the fixing member 35.

Figure 8:
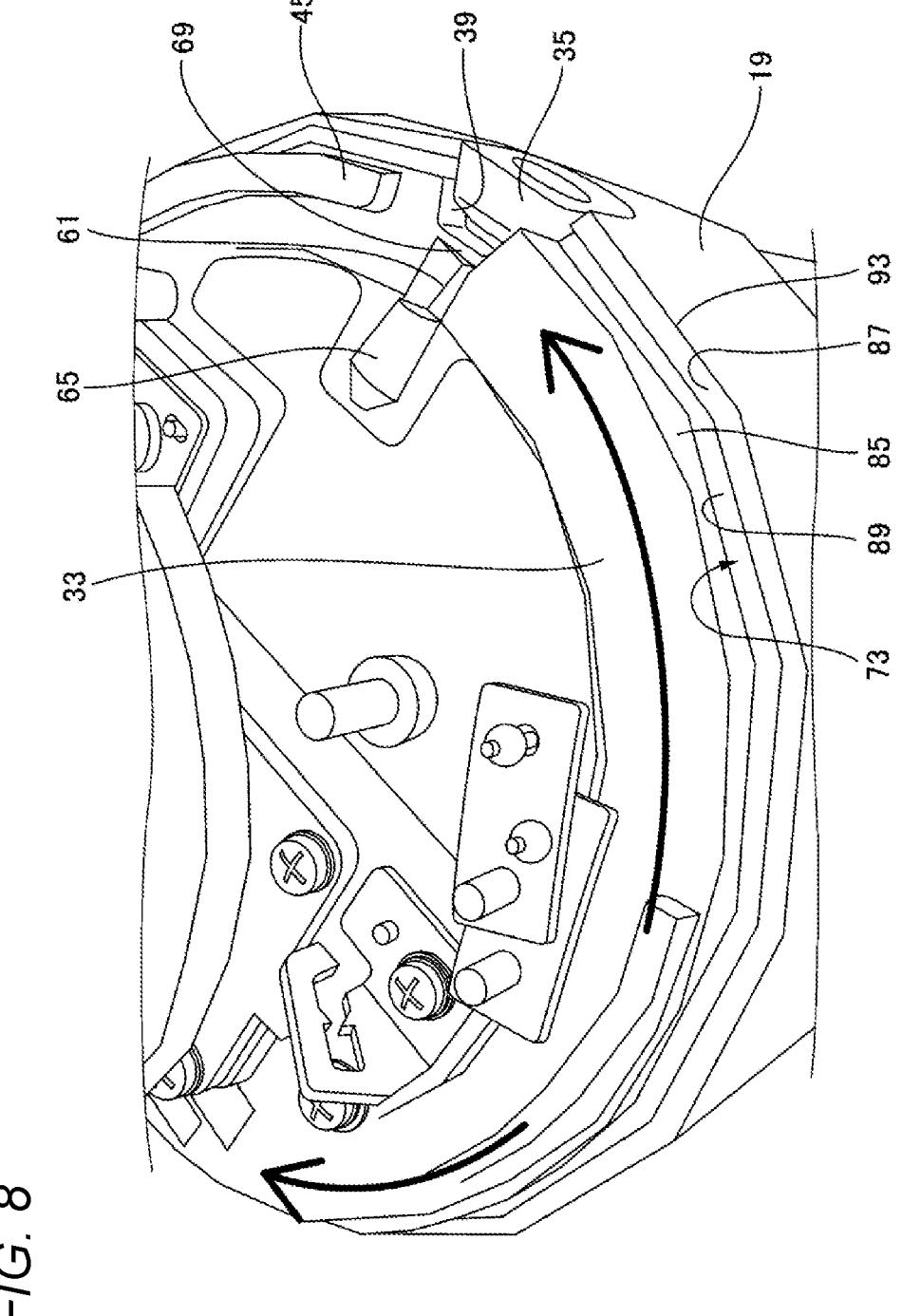
FIG. 8 is a perspective view showing an upper end surface of the rotation seat.

FIG. 8 is a perspective view showing the upper end surface 33 of the rotation seat 19. The upper end surface 33 of the rotation seat 19 has a groove 73 over an entire circumference of the upper end surface 33. The groove 73 passes through the recess 39B (see FIG. 5). The recess 39B is provided at each 180° in the circumferential direction of the rotation seat 19 as described above. Accordingly, the groove 73 is divided by two recesses 39B. In other words, the groove 73 is connected to the respective recesses 39B from two sides in the circumferential direction.

Figure 9:
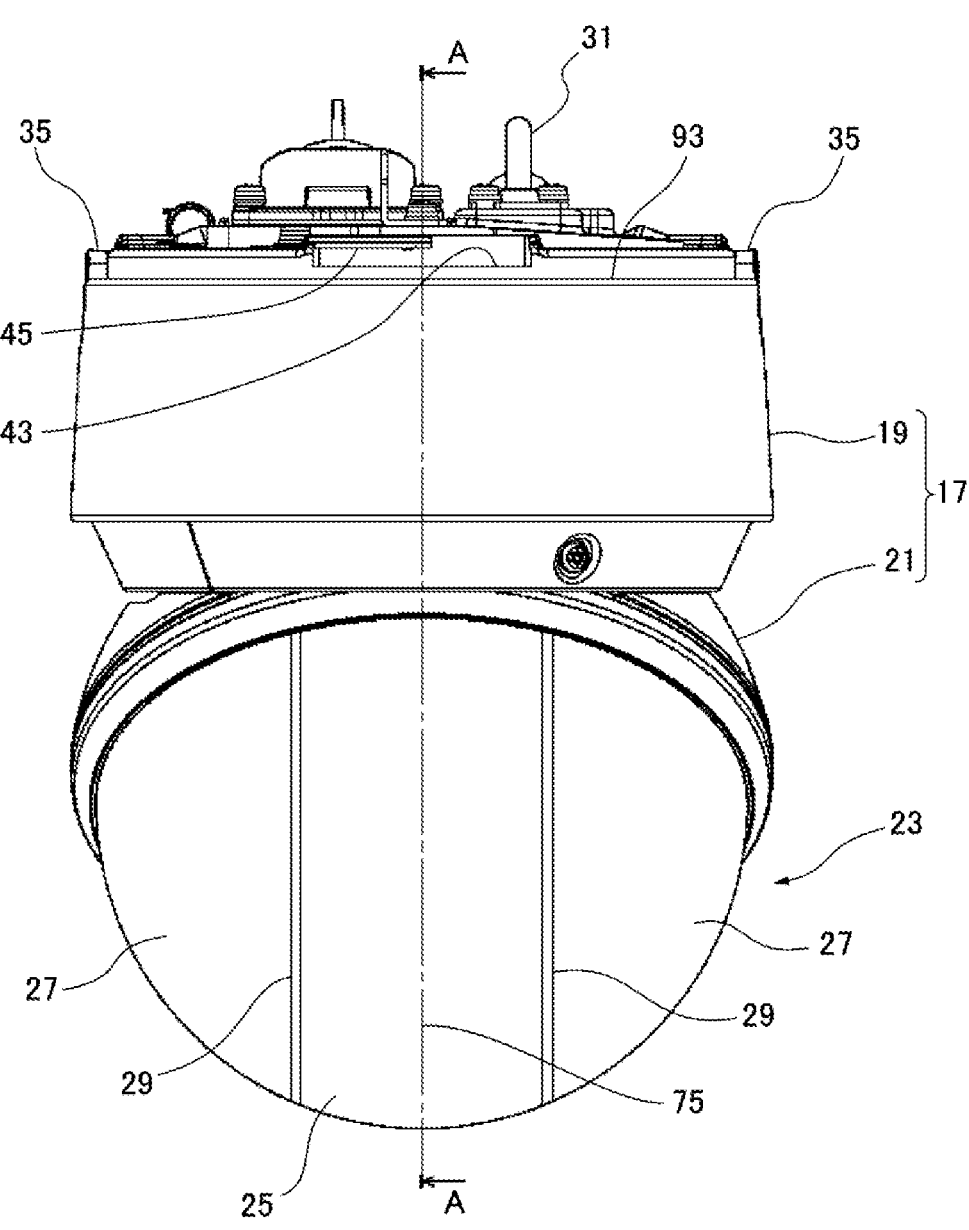
FIG. 9 is a front view of the case.

FIG. 9 is a front view of the main case 17. The rotation seat 19, which is a component of the main case 17, is supported by the bracket 15 with the upper end surface 33 (see FIG. 2) facing upward when the surveillance camera 11 is installed. At this time, the upper end surface 33 of the rotation seat 19 is positioned parallel to a horizontal plane.

The upper end surface 33 is covered with the bracket 15 when the rotation seat 19 is attached to the bracket 15. In FIG. 9, on the outer peripheral side of the upper end surface 33, the fixing member 35 whose upper half portion protrudes from the groove 73 is visible.

Figure 10:
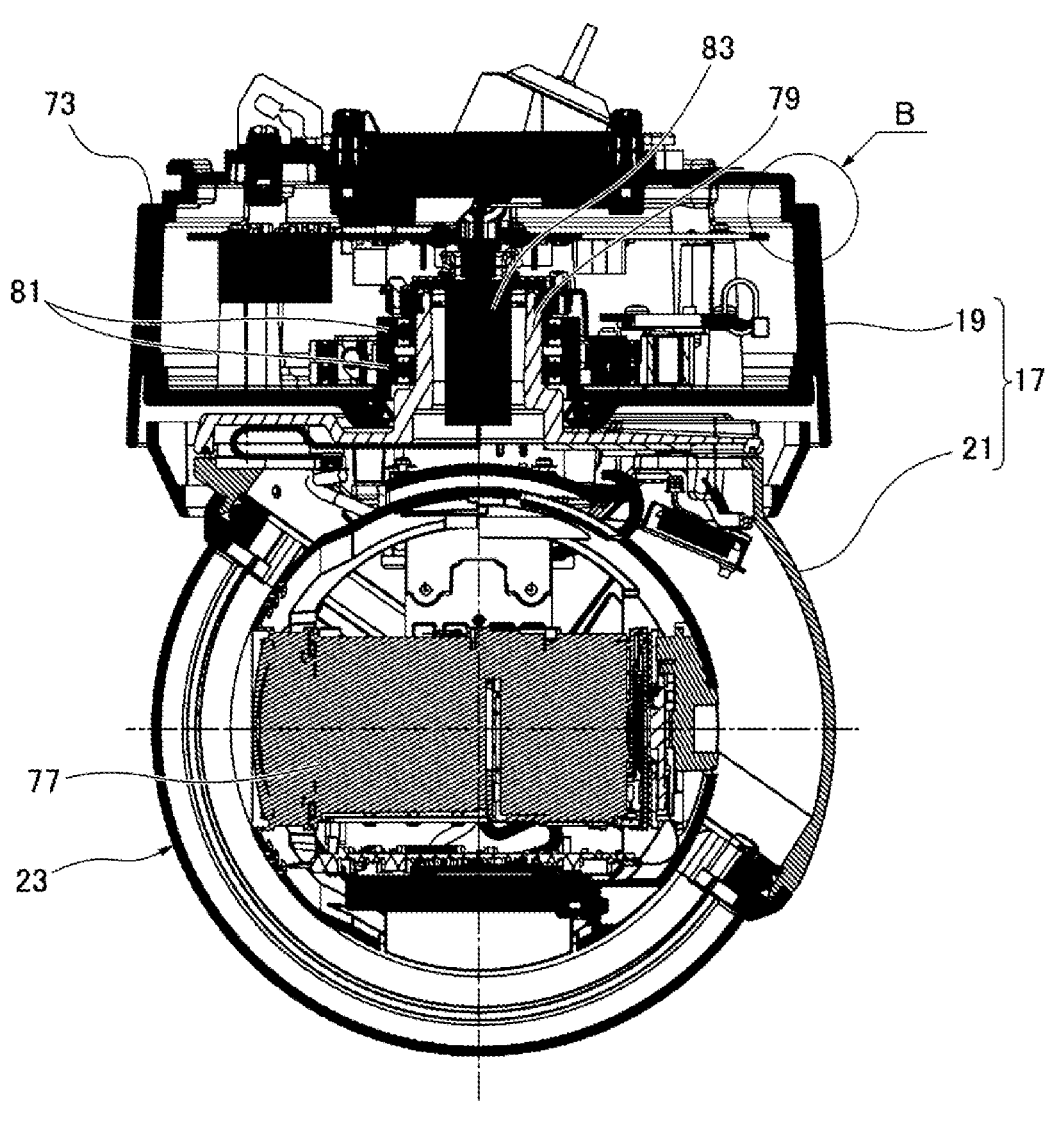
FIG. 10 is a sectional view of the case taken along a line A-A in FIG. 9 on a plane including a central axis of the rotation seat.

FIG. 10 is a sectional view of the main case 17 taken along a line A-A in FIG. 9 on a plane including a central axis 75 of the rotation seat 19. The groove 73 is located on the outer peripheral side of the upper end surface 33 of the rotation seat 19 in FIG. 10. The groove 73 opens upward and is formed on the outer peripheral side of the upper end surface 33. The groove 73 is disposed inward of the outer peripheral surface of the bracket 15 when the rotation seat 19 is attached to the bracket 15. That is, the groove 73 is covered by the bracket 15 from above. At this time, the gap S (see FIG. 4) is defined between the groove 73 and the lower end surface 37 of the bracket 15.

A camera unit 77 supported by a tilt rotation mechanism is accommodated in the camera case 21 rotatably supported by the rotation seat 19. The camera unit 77 is covered with the cover 23 attached to the camera case 21. The camera case 21 accommodating the camera unit 77 is supported by a pan rotation shaft 79 in a manner of being pan-rotatable relative to the rotation seat 19. The pan rotation shaft 79 is rotatably supported by a plurality of bearings 81 provided in the rotation seat 19. A slip ring 83 described later is inserted through an inner hole of the pan rotation shaft 79.

Figure 11:
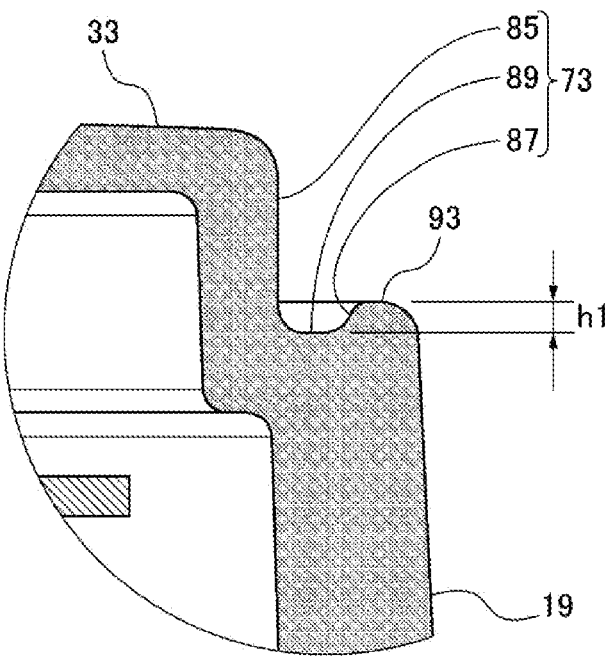
FIG. 11 is an enlarged view of a portion B in FIG. 10.

FIG. 11 is an enlarged view of a portion B in FIG. 10. The groove 73 includes a rear wall 85, a front wall 87, and a bottom wall 89 coupling the rear wall 85 to the front wall 87. The rear wall 85 is an outer peripheral surface of the upper end surface 33 of the rotation seat 19. As shown in FIGS. 9 and 10, a position of the groove 73 in FIG. 11 is a position separated by 90° in the circumferential direction from the recess 39B into which the fixing member 35 is inserted. The groove 73 in this position has a depth of h1.

Figure 12:
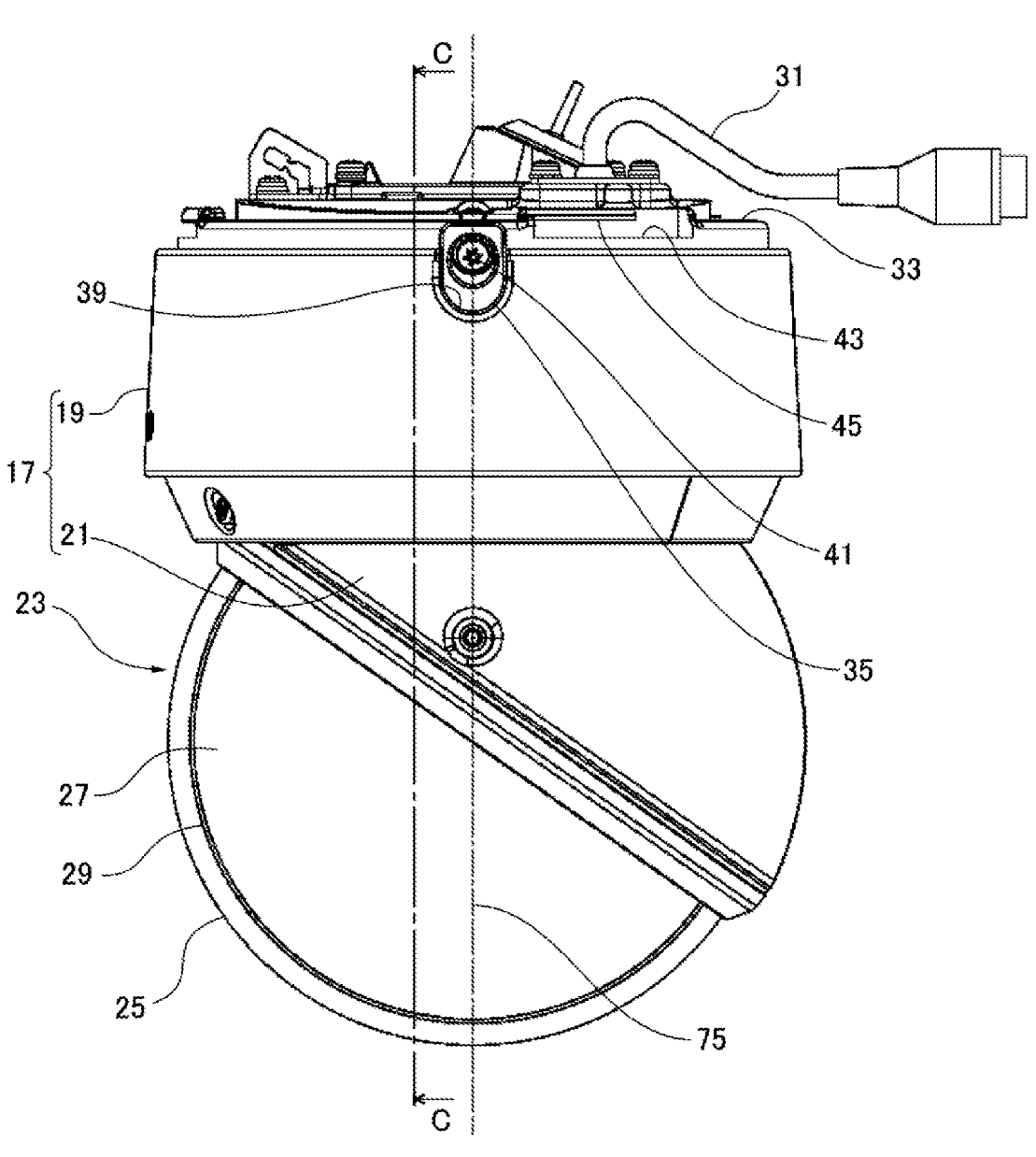
FIG. 12 is a side view of the case.

FIG. 12 is a side view of the main case 17. As shown in FIG. 12, when the rotation seat 19 is viewed from a lateral side, the recess 39B provided at each 180° in the circumferential direction of the rotation seat 19 and the fixing member 35 fastened to the recess 39B are located in a center. The groove 73 is divided by the recess 39B. In other words, the groove 73 is connected to the respective recesses 39B from two sides in the circumferential direction.

Figure 13:
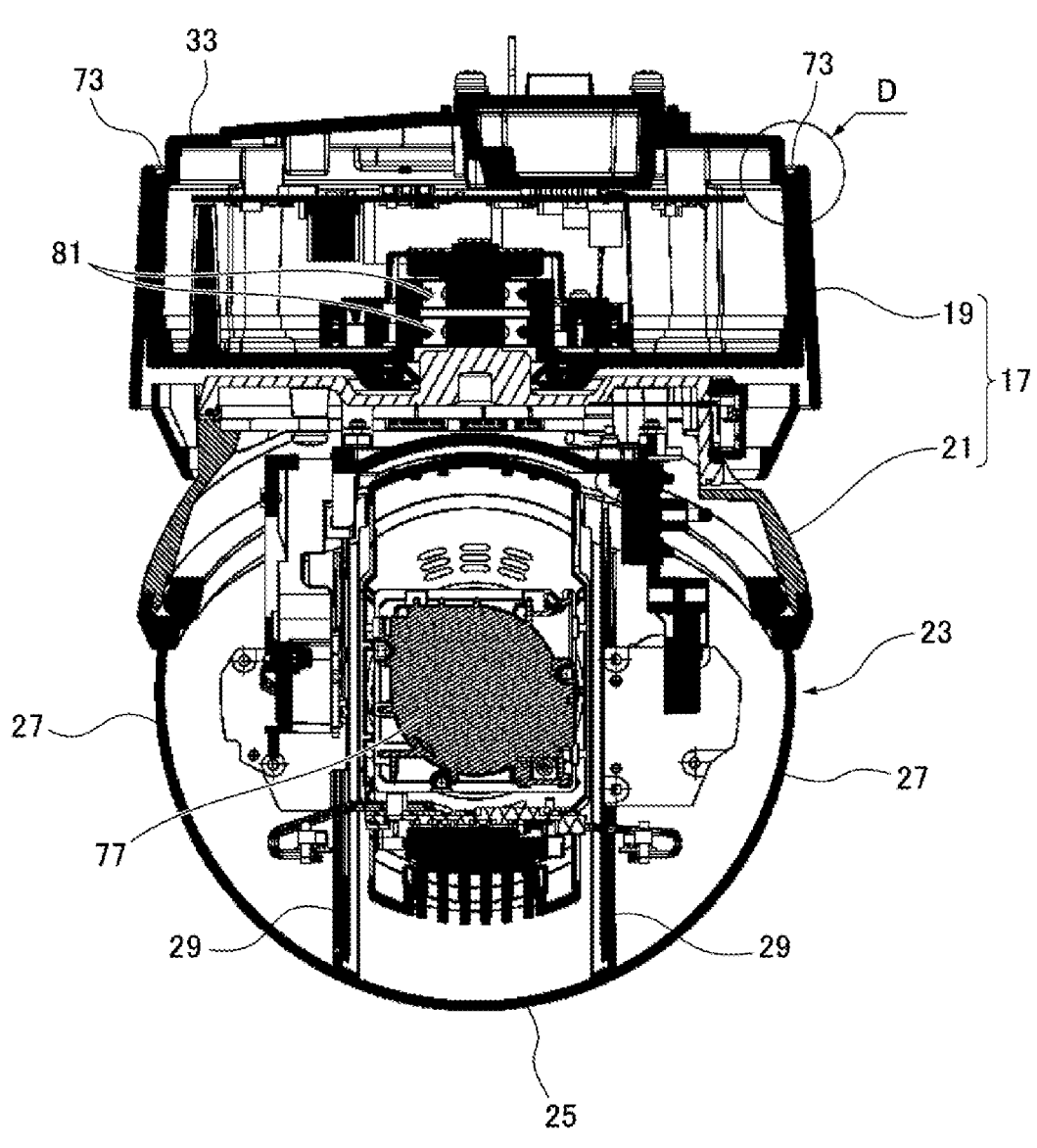
FIG. 13 is a sectional view of the case taken along a line C-C in FIG. 12 on a plane parallel to the plane including the central axis of the rotation seat.

FIG. 13 is a sectional view of the main case 17 taken along a line C-C in FIG. 12 on a plane parallel to the plane including the central axis 75 of the rotation seat 19. The groove 73 is located on the outer peripheral side of the upper end surface 33 of the rotation seat 19 in FIG. 13, similar to FIG. 10. The groove 73 opens upward and is formed in the upper end surface 33. Similar to the above, the groove 73 is disposed inward of the outer peripheral surface of the bracket 15 when the rotation seat 19 is attached to the bracket 15.

Figure 14:
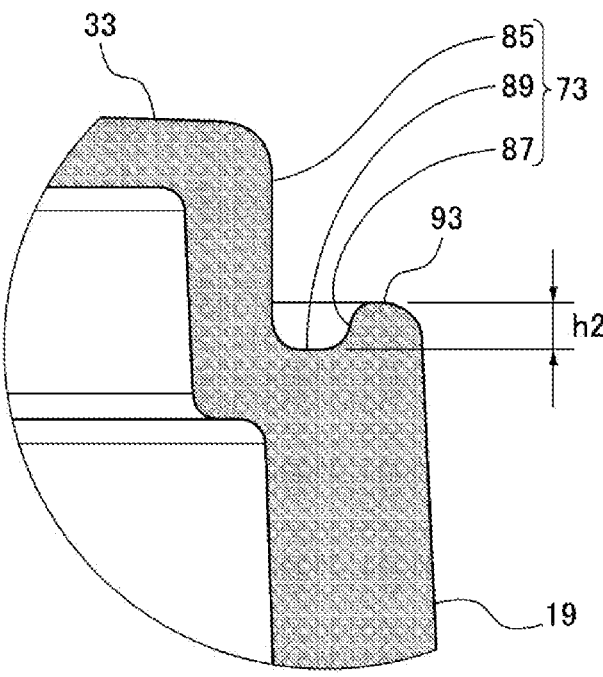
FIG. 14 is an enlarged view of a portion D in FIG. 13.

FIG. 14 is an enlarged view of a portion D in FIG. 13. The groove 73 includes the rear wall 85, the front wall 87, and the bottom wall 89 coupling the rear wall 85 to the front wall 87 even in a position of the C-C cross-section in FIG. 12. However, the groove 73 in this position has a depth of h2 larger than h1 (h1<h2). The groove 73 is shallowest in a position of 90° in the circumferential direction from a position of 180° in the circumferential direction of the rotation seat 19 in which the recess 39B is provided (h1). That is, as shown in FIG. 8, the groove 73 has a downward gradient from the position h1 toward the position h2 in which the recess 39B is provided. Arrows in FIG. 8 indicate directions of the downward gradient. A part surrounded by a circle in FIG. 8 indicates a shallowest (h1) part of the groove 73.

As shown in FIG. 4, the rear wall 85 constituting the groove 73 is higher than the front wall 87. The rear wall 85 has an upright top end portion 91 disposed in an internal space of the bracket 15. The lower end surface 37 of the bracket 15 faces an upright end surface 93 of the front wall 87. A part of the rear wall 85 above the upright end surface 93 faces an inner peripheral surface of the bracket 15.

Next, operation of the first embodiment will be described.

The surveillance camera 11 according to the first embodiment includes the bracket 15, the main case 17 that includes the camera unit 77 and is suspended and supported by the bracket 15, and the fixing member 35 interposed between the bracket 15 and the main case 17. The fixing member 35 presses and fixes the lower end surface 37 of the bracket 15 and the upper end surface 33 of the main case 17.

In the surveillance camera 11 according to the first embodiment, the bracket 15 is fixed to a pole or the like. The upper end surface 33 of the main case 17 is supported by the lower end surface 37 of the bracket 15 in a state of being locked to and suspended by the locking structure. That is, the main case 17 accommodating the camera unit 77 is integrally attached to the bracket 15 in a state of hanging therefrom.

In the surveillance camera 11, the fixing member 35 is interposed between the bracket 15 and the main case 17. The fixing member 35 presses and fixes the lower end surface 37 of the bracket 15 and the upper end surface 33 of the main case 17 in the direction of separating the lower end surface 37 and the upper end surface 33. In other words, in the surveillance camera 11, the fixing member 35 having a function of a wedge is sandwiched between the bracket 15 and the main case 17. Accordingly, in the surveillance camera 11, the lower end surface 37 of the bracket 15 is pressed in a direction away from the upper end surface 33 of the main case 17, and the lower end surface 37 and upper end surface 33 do not move in a direction toward each other. As described later, the fixing member 35 is fastened from outside the gap S (see FIG. 4).

In the surveillance camera 11, although the lower end surface 37 and the upper end surface 33 are pressed by the fixing member 35 in the direction of being separated from each other, the lower end surface 37 and the upper end surface 33 would not be separated by a prescribed distance or more due to the locking structure since the lower surface of the locking portion abuts against the upper surface of the locked portion.

Accordingly, in the surveillance camera 11, movement in the up-down direction is well restricted, and rattling of the camera case 21 is prevented even when the surveillance camera 11 is installed in an outdoor environment of rain, snow, wind blowing, and the like. As a result, the surveillance camera 11 can prevent shaking of a captured image and ultimately image quality deterioration due to wind pressure or vibration.

In the surveillance camera 11, the bracket 15 has a first recess (recess 39A) in which the fixing member 35 is disposed, and the main case 17 has a second recess (recess 39B) in which the fixing member 35 is disposed. The first recess is constituted by a first bottom surface (back surface 39C) and a pair of first side surfaces (tapered surfaces 57), and is opened toward the main case 17. The second recess is constituted by a second bottom surface (back surface 39C) and a pair of second side surfaces (tapered surfaces 57), and is opened toward the bracket 15. The fixing member 35 abuts across the pair of first side surfaces and the pair of second side surfaces.

In the surveillance camera 11, the fixing member 35 presses across the pair of first side surfaces (tapered surfaces 57) of the first recess (recess 39A) of the bracket 15 and the pair of second side surfaces (tapered surfaces 57) of the second recess (recess 39B) of the rotation seat 19 of the main case 17. Accordingly, the fixing member 35 is press-fitted in a wedge shape between the lower end surface 37 of the bracket 15 and the upper end surface 33 of the rotation seat 19, and does not move in the circumferential direction or the left-right direction. Here, a reason why the fixing member 35 does not move in the circumferential direction is that the fixing member 35 is press-fitted between the recess 39A and the recess 39B. That is, the rotation seat 19 (surveillance camera 11) is rotated relative to the bracket 15 and the locking portion is locked to the locked portion, and thus the surveillance camera 11 can be rotated in the circumferential direction in a state in which the locking portion is locked to the locked portion. Here, since the fixing member 35 is press-fitted across the recess 39A and the recess 39B, the surveillance camera 11 cannot rotate relative to the bracket 15. Accordingly, the surveillance camera 11 does not move in the circumferential direction.

In the surveillance camera 11, the pair of first side surfaces (tapered surfaces 57) and the pair of second side surfaces (tapered surfaces 57) are separated from each other.

That is, in the surveillance camera 11, the fixing member 35 presses the pair of first side surfaces (tapered surfaces 57) and the pair of second side surfaces (tapered surfaces 57) in a state of separating the pair of first side surfaces (tapered surfaces 57) and the pair of second side surfaces (tapered surfaces 57). Accordingly, in the surveillance camera 11, the bracket 15 and the main case 17 are firmly fixed.

In the surveillance camera 11, the lower end surface 37 of the bracket 15 and the upper end surface 33 of the main case 17 have the gap S in the up-down direction.

In the surveillance camera 11, the upper end surface 33 of the main case 17 is integrally attached to the lower end surface 37 of the bracket 15 by the locking structure in a state of hanging therefrom. The fixing member 35 is interposed between the bracket 15 and the main case 17. The fixing member 35 is interposed between the bracket 15 and the main case 17 in a state in which a wedge is driven.

In this manner, in the surveillance camera 11, the gap S is positively ensured between the lower end surface 37 of the bracket 15 and the upper end surface 33 of the main case 17. Since the gap S is provided in the surveillance camera 11, the fixing member 35 can be inserted between the bracket 15 and the main case 17 in a state in which a wedge is driven.

In addition, in the surveillance camera 11, the main case 17 includes the locking portion. The bracket 15 includes the locked portion that is locked to the locking portion of the main case 17.

In the surveillance camera 11, the locking portion of the main case 17 is on the upper end surface 33. On the other hand, the locked portion that is locked to the locking portion of the bracket 15 is on the lower end surface 37. A plurality of locking structures each including the locking portion and the locked portion are provided at equal intervals along the circumferential direction on the lower end surface 37 of the bracket 15 and the upper end surface 33 of the main case 17.

In each of the locking structures, locking between the bracket 15 and the main case 17 can be implemented by rotating the upper end surface 33 of the main case 17 while abutting the upper end surface 33 in parallel against the lower end surface 37 of the bracket 15. Accordingly, a plurality of locking portions provided on the upper end surface 33 of the main case 17 are locked to respective locked portions provided on the lower end surface 37 of the bracket 15, and the main case 17 is supported by the bracket 15 and is restricted from falling.

In the locking structure, the locking portion and the locked portion are engaged from a horizontal direction and overlapped in the up-down direction, and movement thereof in the up-down direction is restricted. On the other hand, the locking portion and the locked portion allow sliding operation for engagement, and thus a slight clearance is necessary in the up-down direction. The clearance is a factor that causes the main case 17 to slightly rattle in the up-down direction relative to the bracket 15 due to wind pressure and vibration.

In the surveillance camera 11, the rattling is prevented by the fixing member 35 fixed in a state in which a wedge is driven.

In the surveillance camera 11, a state in which the locking portion of the main case 17 locks the locked portion of the bracket 15 and is suspended and supported can be referred to as temporary fixing. The surveillance camera 11 can be brought into a temporarily fixed state by an easy operation of rotating the main case 17 while abutting the main case 17 against the bracket 15. On the other hand, in the temporarily fixed state, the surveillance camera 11 is easy to rotate in an unlocking direction when rattling occurs due to the above-described clearance.

After the temporary fixing, the surveillance camera 11 is fixed in a state in which the fixing member 35 is driven into a wedge. A state in which the fixing member 35 is fixed in the surveillance camera 11 can be referred to as main fixing.

Accordingly, the surveillance camera 11 can be firmly fixed while facilitating attachment work by dividing the attachment work into two stages of temporary fixing and main fixing.

In the surveillance camera 11, the fixing member 35 includes the screw member 41 screwed to the main case 17, and the pressing portion that presses the main case 17 and the bracket 15 in the separating direction.

In the surveillance camera 11, the fixing member 35 includes the screw member 41 and the pressing portion. The fixing member 35 is fixed to the main case 17 by the screw member 41 screwed into the main case 17. When the fixing member 35 is fixed to the main case 17 by the screw member 41, the pressing portion can press the main case 17 and the bracket 15 in the separating direction. The state in which a wedge is driven as described above refers to a state in which the fixing member 35 is fixed by fastening of the screw member 41 and the main case 17 and the bracket 15 are pressed by a fixing force in the separated direction. The fixing member 35 is not actually driven from outside the gap S.

In the surveillance camera 11, the pressing portion includes the first inclined surface 51 that is inclined from an outer side surface toward an inner side surface of the main case 17. The main case 17 has the second inclined surface 53 abutting against the first inclined surface 51.

In the surveillance camera 11, the pressing portion of the fixing member 35 has the first inclined surface 51. The first inclined surface 51 is inclined at an upward gradient from the outer side surface toward the inner side surface of the main case 17. The gap S described above in the horizontal direction is defined between the bracket 15 and the main case 17. The elongated recess 39 is formed between the bracket 15 and the main case 17 by crossing the gap S up and down. That is, the recess 39 includes the recess 39A in the bracket 15 and the recess 39B in the main case 17.

The recess 39B has the second inclined surface 53 that abuts in parallel against the first inclined surface 51 of the pressing portion. That is, the second inclined surface 53 is also inclined at an upward gradient from the outer side surface toward the inner side surface of the main case 17. In other words, the second inclined surface 53 is inclined at a downward gradient from the inner peripheral surface toward the outer side surface of the main case 17.

When the screw member 41 is fastened from obliquely below, the first inclined surface 51 is pressed against the second inclined surface 53 of the recess 39B, and the fixing member 35 slides upward on the second inclined surface 53 by a reaction force received from the second inclined surface 53. Accordingly, an upper end of the fixing member 35 pushes up an upper half portion of the bracket 15. That is, the fixing member 35 can press the main case 17 and the bracket 15 in the separating direction by the fastening operation of the screw member 41.

In the surveillance camera 11, the pressing portion has the abutment portion 55 that abuts against the bracket 15.

In the surveillance camera 11, the pressing portion of the fixing member 35 has the abutment portion 55 at the upper end. That is, when the screw member 41 is fastened, the fixing member 35 slides upward on the second inclined surface 53 by the reaction force received from the second inclined surface 53. Accordingly, the abutment portion 55 formed at the upper end of the fixing member 35 pushes up the upper half portion of the bracket 15 in the recess 39 provided across the main case 17 and the bracket 15. Accordingly, the fixing member 35 fastened to the main case 17 can apply a force in the direction of separating the bracket 15 and the main case 17 in the up-down direction by pressing down the recess 39B with the first inclined surface 51 and pressing up the recess 39A with the abutment portion 55.

In the surveillance camera 11, the screw member 41 has the male screw portion 59. The main case 17 includes the protruding portion 69 having the female screw hole 71 through which the male screw portion 59 passes to be screwed thereto. The screw member 41 is lockable to the protruding portion 69 in a state in which the male screw portion 59 passes through the female screw hole 71.

In the surveillance camera 11, the screw member 41 has the male screw portion 59. The screw member 41 has the large diameter portion at a top end of the shaft portion, and the male screw portion 59 on the outer periphery of the large diameter portion. That is, in the screw member 41, the neck portion 61 between the male screw portion 59 and the head portion of the screw member 41 has a smaller diameter than the male screw portion 59.

In the screw member 41, the male screw portion 59 and the neck portion 61 penetrate the fixing member 35, and the head portion abuts on the seating surface 63 of the fixing member 35. The screw member 41 fastens the fixing member 35 by screwing the male screw portion 59 to the fixing portion 65 provided in the main case 17.

The main case 17 includes the protruding portion 69 in a vicinity of the fixing portion 65. The protruding portion 69 has the female screw hole 71 to which the male screw portion 59 is screwed. A distance between the protruding portion 69 and the fixing portion 65 is set to be larger than the entire length of the male screw portion 59.

The screw member 41 passing through the fixing member 35 is first screwed to the female screw hole 71 of the protruding portion 69, and the male screw portion 59 reaches and is screwed to the fixing portion 65 after passing through the female screw hole 71. The screw member 41 fixes the fixing portion 35 at the head portion thereof by fastening the male screw portion 59 to the fixing portion 65.

On the other hand, when the fixing of the screw member 41 is released, the male screw portion 59 is detached from the fixing portion 65. The detached male screw portion 59 reaches the protruding portion 69, so that passage thereof is restricted. That is, the screw member 41 is suspended in a state in which the screw member 41 is caught by the protruding portion 69 of the main case 17 while penetrating the fixing member 35. Accordingly, the screw member 41 and the fixing member 35 are restricted from falling from the main case 17. To detach the screw member 41 and the fixing member 35 from the main case 17, the screw member 41 is rotated and screwed to the female screw hole 71 and the male screw portion 59 passes through the protruding portion 69, so that the screw member 41 and the fixing member 35 are detached.

In the surveillance camera 11, the upper end surface 33 of the main case 17 includes the rear wall 85, the front wall 87, and the bottom wall 89 coupling the rear wall 85 to the front wall 87. The main case 17 has the groove 73 among the rear wall 85, the front wall 87, and the bottom wall 89 over the entire circumference of the upper end surface 33.

In the surveillance camera 11, the groove 73 is formed in the upper end surface 33 of the main case 17 over the entire circumference. The groove 73 includes a rear wall 85, a front wall 87, and a bottom wall 89 coupling the rear wall 85 to the front wall 87. That is, the groove 73 constitutes a gutter (also referred to as a pit) that is formed along the entire circumference of the upper end surface 33 of the main case 17 and through which water can flow.

The surveillance camera 11 is installed in an orientation in which the upper end surface 33 of the main case 17 is horizontal. The upper end surface 33 may be provided at a slight gradient inclined downward toward the groove 73 in a radial direction. Accordingly, rainwater entering the upper end surface 33 through the gap S flows into the groove 73.

When the upper end surface 33 of the main case 17 is circular, the groove 73 is divided by the recess 39 provided at intervals of 180° in the circumferential direction. The fixing member 35 is inserted into and fixed to the recess 39, and a gap allowing water to flow down is formed between the recess 39 and the fixing member 35. That is, the water flowing into the groove 73 reaches the recess 39 on a half circumference basis, and is discharged to a side surface of the main case 17 through the gap between the recess 39 and the fixing member 35. That is, the gap functions as a drain channel.

Water discharged from these two positions and flowing down falls from a lower end of the main case 17 through the side surface of the main case 17. The main case 17 includes the upper rotation seat 19 and the lower camera case 21. The camera unit 77 accommodated in the camera case 21 is covered with the dome-shaped cover 23. The cover 23 is disposed in a position retracted from an outer periphery of the rotation seat 19 so as not to come into contact with the water falling from the main case 17. Accordingly, even when rainwater entering the upper end surface 33 of the main case 17 flows through the groove 73 and is drained from the gap between the recess 39 and the fixing member 35, the falling drainage water is less likely to wet the cover 23 and interfere with imaging.

In the surveillance camera 11, the rear wall 85 is higher than the front wall 87. The top end portion 91 of the rear wall 85 is disposed in the internal space of the bracket 15, a surface of the rear wall 85 on a front wall side faces the inner peripheral surface of the bracket 15, and the lower end surface 37 of the bracket 15 faces the upright end surface 93 of the front wall 87.

In the surveillance camera 11, the rear wall 85 of the groove 73 is higher than the front wall 87. The upright top end portion 91 of the rear wall 85 higher than the front wall 87 is disposed in the internal space of the bracket 15. The surface of the upright rear wall 85 on the front wall side faces the inner peripheral surface of the bracket 15. The lower end surface 37 of the bracket 15 faces an upright end surface 93 of the front wall 87.

That is, the groove 73 communicates with outside through the narrow gap S sandwiched between the lower end surface 37 of the bracket 15 and the upright end surface 93 of the front wall 87. This makes it less likely for rainwater from a lateral direction to be directly blown into the groove. Even when rainwater is temporarily blown into the gap S by wind pressure, the rainwater abuts against the surface of the rear wall 85 on the front wall side, and is less likely to directly enter deep on the upper end surface 33. That is, the gap S provided between the bracket 15 and the main case 17 can smoothly drain the entering rainwater while having a trap structure that reduces the blowing of rainwater.

Background to Second Embodiment

For example, JP2021-36293A discloses an imaging apparatus including a dome cover, a body substrate, a base portion supporting the body substrate, a first lens cover disposed on a lens side of a lens unit, that is, on a dome cover side, a second lens cover disposed on an imaging element side opposite to a lens of the lens unit, that is, on a body substrate side relative to the first lens cover, a sensor substrate having an imaging element, and a heat transfer member in contact with the sensor substrate and the first lens cover. The first lens cover is made of metal, and the second lens cover is made of resin.

In the surveillance camera in the related art, heat generated from electrical components mounted on the body substrate is transferred to the base portion. However, when the base portion is fixed to a ceiling, a wall, or the like, heat dissipation to the atmosphere may significantly decrease and heat dissipation efficiency may deteriorate. In addition, in a structure of the surveillance camera in the related art, the heat is transferred to the entire base portion, and thus a component adjacent to the base portion may be unintentionally thermally damaged.

A second embodiment below describes an example of a surveillance camera that can properly dissipate heat to outside even when a substrate generates heat.

Second Embodiment

Hereinafter, the surveillance camera 11 according to the second embodiment will be described. In description of the surveillance camera 11 according to the second embodiment, the same reference numerals are given to configurations overlapping those of the surveillance camera 11 according to the first embodiment, description thereof will be simplified or omitted, and different contents will be described.

Figure 15:
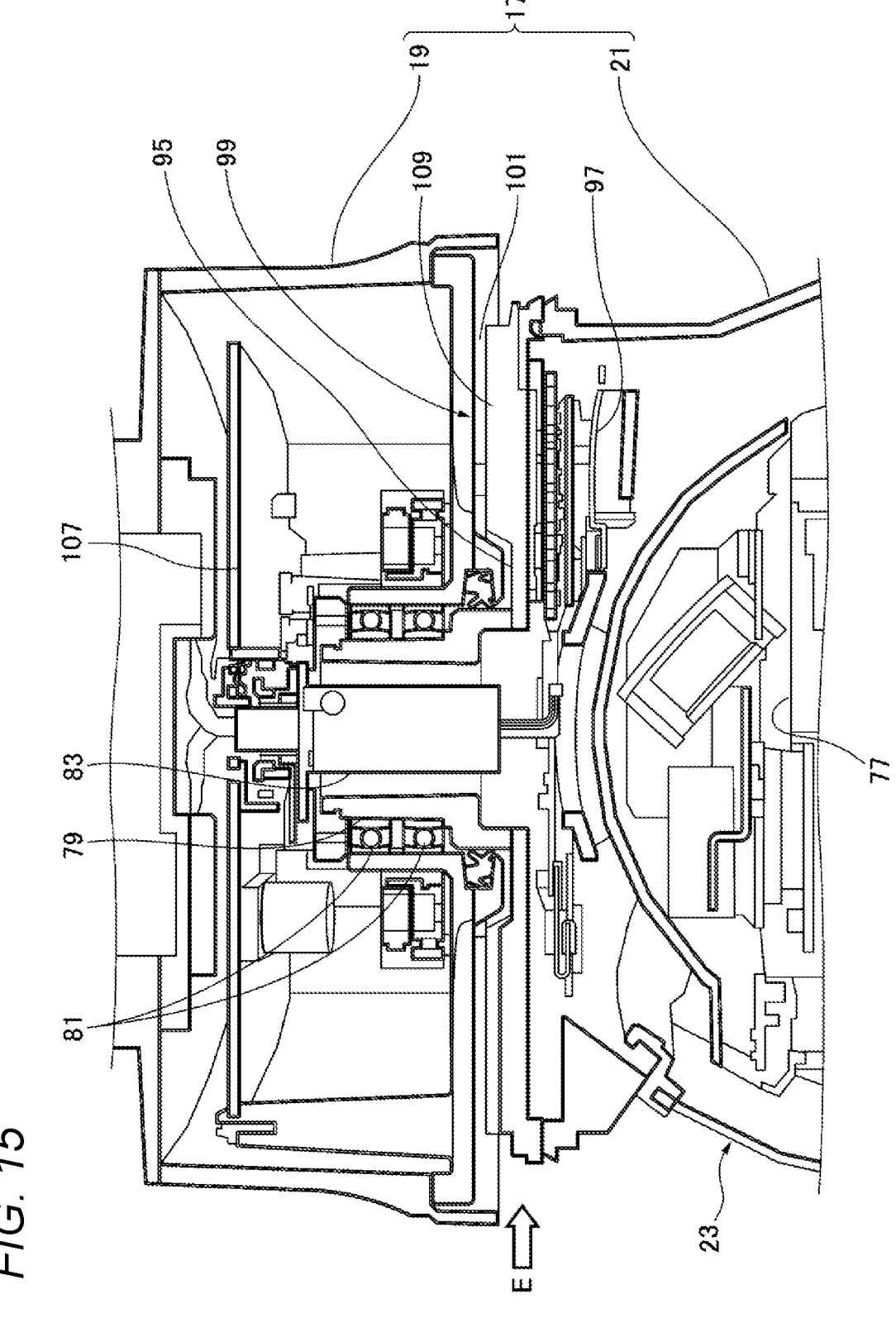
FIG. 15 is a longitudinal sectional view of a main portion of the case.

FIG. 15 is a longitudinal sectional view of a main portion of the main case 17. In the surveillance camera 11, the camera case 21 includes a substrate holding portion 95 formed of metal. The substrate holding portion 95 may be made of, for example, aluminum or an aluminum alloy by die casting. The substrate holding portion 95 includes, on an inner side surface thereof, a first substrate 97 on which electronic components for processing data transmitted from the camera unit 77 are mounted. The substrate holding portion 95 includes a heat dissipating portion 99 on an outer side surface thereof.

Figure 16:
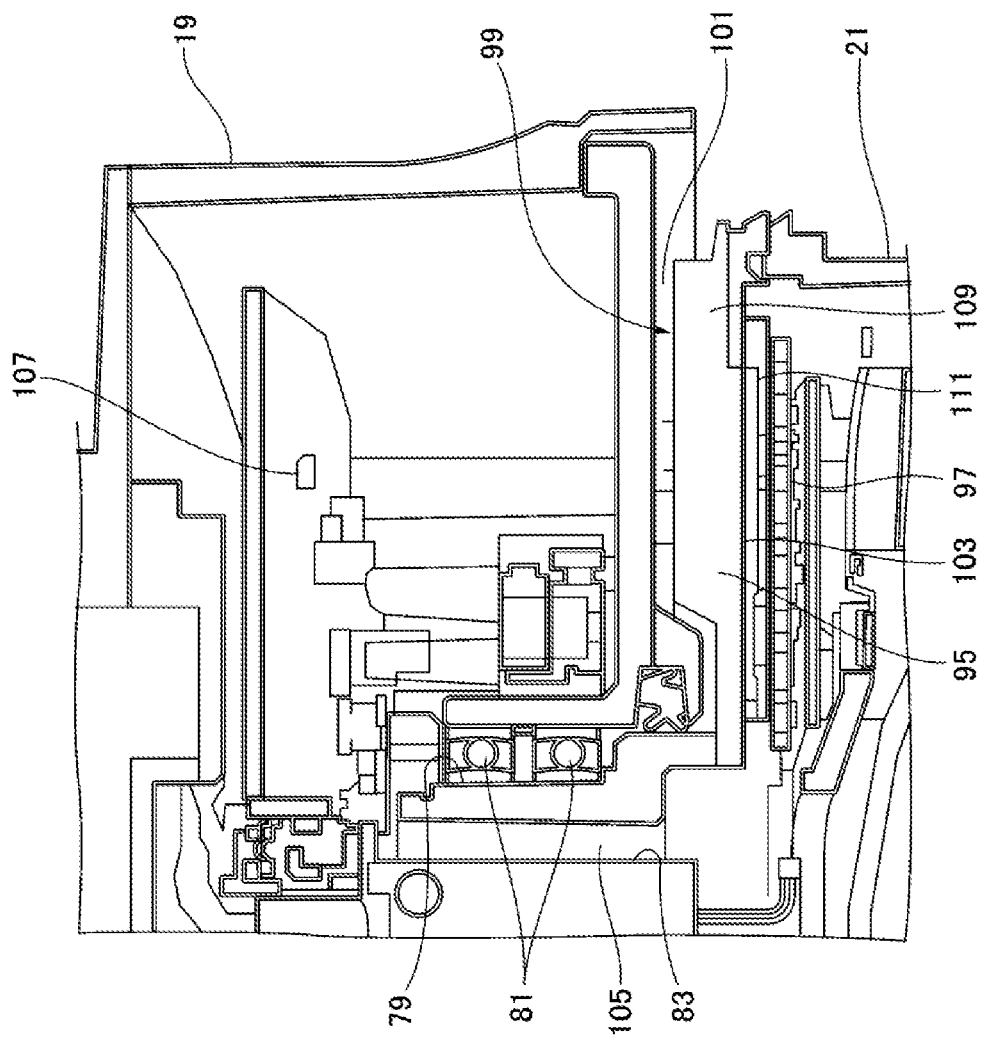
FIG. 16 is an enlarged view of a main portion of FIG. 15.

FIG. 16 is an enlarged view of a main portion of FIG. 15. In the surveillance camera 11, the rotation seat 19 faces the outer side surface of the substrate holding portion 95. A heat dissipation space 101 is provided between the rotation seat 19 and the outer side surface of the substrate holding portion 95.

The heat dissipation space 101 communicates with an external space. Accordingly, high-temperature air subjected to heat exchange by the heat dissipating portion 99 is easily discharged to the external space.

The heat dissipating portion 99 is continuous with a substrate fixing surface 103 of the substrate holding portion 95 on which the first substrate 97 is disposed.

The substrate holding portion 95 has a connection hole 105 communicating with the rotation seat 19. The connection hole 105 is provided with the slip ring 83. The rotation seat 19 includes therein a second substrate 107 connected to the first substrate 97 via the slip ring 83. The heat dissipating portion 99 is provided on an outer peripheral side of the substrate holding portion 95 relative to the connection hole 105.

Figure 17:
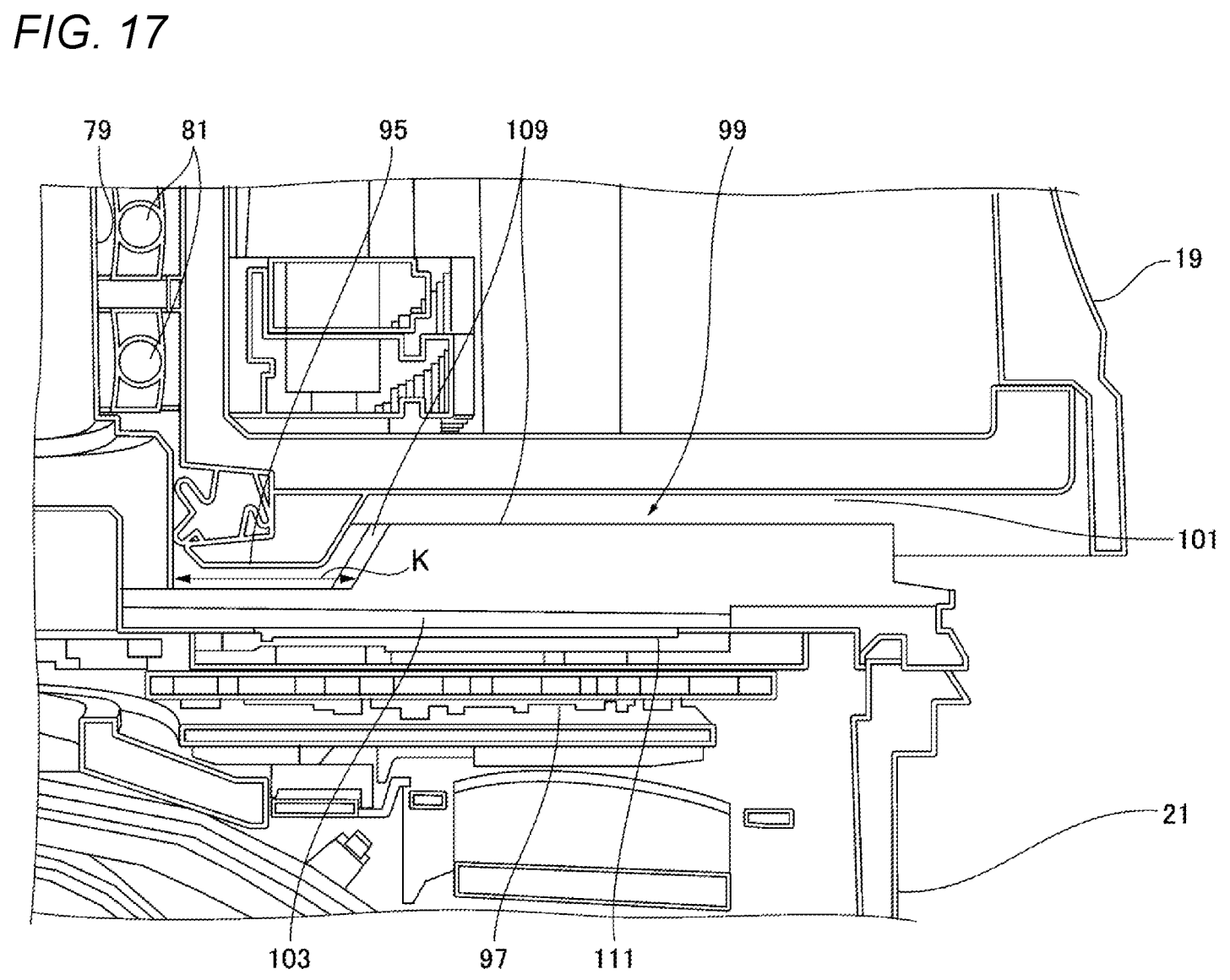
Figure 18:
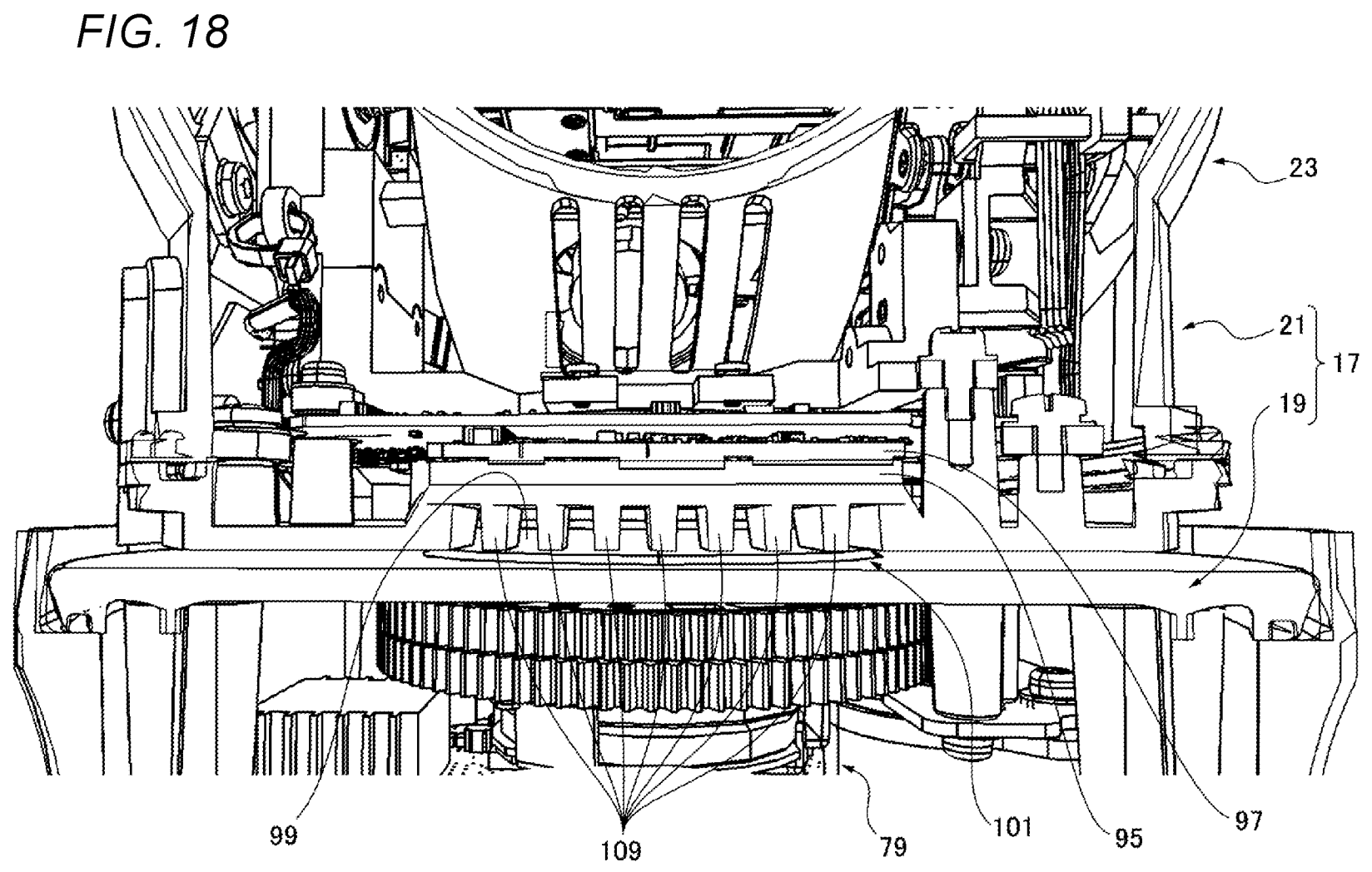

FIG. 17 is an enlarged view of a main portion of FIG. 16. FIG. 18 is an external view in which the rotation seat and the camera case viewed from a direction E in FIG. 15 are reversed upside down. The heat dissipating portion 99 includes a plurality of heat dissipation plates 109 arranged at intervals between plate surfaces. In FIG. 18, seven heat dissipation plates 109 are provided, and the number of the heat dissipation plates is not limited to seven. Distances between adjacent heat dissipation plates 109 may be the same or different. The heat dissipation plate 109 is a fin formed of a metal having a high thermal conductivity (for example, an aluminum alloy) integrally with the substrate holding portion 95 (by metal casting or cutting). Accordingly, the heat dissipating portion 99 constitutes a heat sink. A mechanism using the plurality of heat dissipation plates 109 as the heat dissipating portion 99 is an example, and other mechanisms may be used as long as the heat dissipating portion 99 promotes heat dissipation.

The heat dissipation plates 109 extend outward from a center of the circular substrate holding portion 95. That is, the plurality of heat dissipation plates 109 extend radially about the pan rotation shaft 79. A gap K is provided between end surfaces of the heat dissipation plates 109 and an outer side surface of the pan rotation shaft 79. Accordingly, heat is easily dissipated from the heat dissipation plates 109 through the gap K, so that heat is less likely to be transferred to the slip ring 83 side and is easily discharged from an inner side of the substrate holding portion 95 of the heat dissipation plates 109.

Next, operation of the second embodiment will be described.

The surveillance camera 11 includes the camera unit 77, the camera case 21 including the camera unit 77 therein, and the rotation seat 19 rotatably connecting the camera case 21. The camera case 21 includes the substrate holding portion 95 formed of metal. The substrate holding portion 95 includes, on the inner side surface thereof, the first substrate 97 on which electronic components that process data transmitted from the camera unit 77 are mounted. The substrate holding portion 95 includes a heat dissipating portion 99 on an outer side surface thereof.

The surveillance camera 11 includes the camera unit 77, the camera case 21, and the rotation seat 19. The surveillance camera 11 includes the bracket 15 described with reference to the first embodiment in addition to these components. In this case, the camera unit 77 is tiltably rotatably accommodated in the camera case 21. The camera case 21 is suspended from the rotation seat 19 and supported by the rotation seat 19 in a pan-rotatable manner. The rotation seat 19 is fixed to the bracket 15 in a suspended state. The rotation seat 19 and the camera case 21 constitute the above-described main case 17.

The camera case 21 includes the metal substrate holding portion 95. The substrate holding portion 95 includes, on the inner side surface thereof, the first substrate 97 on which at least one electronic component that processes data transmitted from the camera unit 77 is mounted. The electronic component serves as a heat source. The substrate holding portion 95 includes, on the outer side surface opposite to the inner side surface, the heat dissipating portion 99 that dissipates heat from the electronic component to outside.

In the surveillance camera 11, the camera case 21 is supported below the rotation seat 19 during operation. The substrate holding portion 95 is located at an uppermost portion of the camera case 21 and faces the rotation seat 19. That is, the outer side surface of the substrate holding portion 95 including the first substrate 97 on the inner side surface is an uppermost surface of the camera case 21 and faces the rotation seat 19.

In the surveillance camera 11, an amount of information processing or a processing speed increases as an image quality of the camera unit 77 increases, and as a result, an amount of heat generated by the electronic component increases. The heat generated by driving of the electronic component mounted on the first substrate 97 is first transferred to the metal substrate holding portion 95. A heat dissipation sheet 111 or the like having a high thermal conductivity is interposed between the first substrate 97 and the substrate holding portion 95, and thermal resistance caused by air interposed therebetween is significantly reduced.

When the heat transferred from the first substrate 97 to the substrate holding portion 95 via the heat dissipation sheet 111 reaches the outer side surface, the heat is dissipated to air from the heat dissipating portion 99 provided on the outer side surface. When a temperature difference occurs due to a high temperature of the first substrate 97 and a low temperature of the substrate holding portion 95, heat transfer occurs in which the heat from the first substrate 97 is transferred to the substrate holding portion 95 via the heat dissipation sheet 111. Heat transferred from the outer side surface of the substrate holding portion 95 to air is transferred by heat transfer including thermal radiation or thermal convection.

Since the heat dissipating portion 99 is provided on the uppermost surface of the camera case 21, the heat dissipating portion 99 can efficiently use natural convection to dissipate heat from the first substrate 97 to air. Accordingly, the camera case 21 can prevent the heat from the first substrate 97 from remaining inside. Accordingly, according to the surveillance camera 11, heat can be reliably dissipated to the outside even when the substrate generates heat.

In the surveillance camera 11, the rotation seat 19 faces the outer side surface of the substrate holding portion 95, and the heat dissipation space 101 is provided between the rotation seat 19 and the outer side surface of the substrate holding portion 95.

In the surveillance camera 11, the rotation seat 19 faces the outer side surface of the substrate holding portion 95. That is, the outer side surface of the substrate holding portion 95 and the rotation seat 19 are separated by a prescribed distance. A space between the rotation seat 19 and the outer side surface of the substrate holding portion 95 serves as the heat dissipation space 101. The prescribed distance in which the heat dissipation space 101 can be defined is a distance in which a space for the heat dissipating portion 99 can be ensured on the outer side surface of the substrate holding portion 95 and heat can be effectively transferred from the heat dissipating portion 99 to air by natural convection. By providing the heat dissipation space 101, a large temperature difference can be obtained between the inner side surface and the outer side surface of the substrate holding portion 95, and cooling efficiency of the first substrate 97 can be improved. This means that the heat from the first substrate 97 remaining in the camera case 21 can be efficiently dissipated at the same time.

In the surveillance camera 11, the heat dissipation space 101 communicates with the external space.

In the surveillance camera 11, the heat dissipation space 101 communicates with the external space. The heat dissipation space 101, which is provided between the camera case 21 and the rotation seat 19 and has a circular plate shape, opens to the outside on a circumferential side. The camera case 21 is rotatably supported to the rotation seat 19 by the cylindrical pan rotation shaft 79 provided at a central portion. That is, a radial direction of the heat dissipation space 101 about the pan rotation shaft 79 is open to the external space. Accordingly, in the surveillance camera 11, when wind is blown to a lateral side of the main case 17, almost all air of a volume of the heat dissipation space 101 is quickly exhausted and replaced with fresh air. That is, good heat dissipation is implemented by the heat dissipation space 101 opened in the circumferential direction.

In the surveillance camera 11, the heat dissipating portion 99 is continuous with the substrate fixing surface 103 of the substrate holding portion 95 on which the first substrate 97 is disposed.

In the surveillance camera 11, the first substrate 97 is disposed on the substrate fixing surface 103 of the substrate holding portion 95. The substrate fixing surface 103 is continuous with the heat dissipating portion 99 in a thickness direction of the first substrate 97. That is, there is no space serving as thermal resistance between the first substrate 97 and the heat dissipating portion 99. Further, positions of the first substrate 97 and the heat dissipating portion 99 coincide inside and outside the camera case 21 even in a plane direction of the first substrate 97. That is, the heat dissipating portion 99 is located directly above the first substrate 97. Accordingly, the heat of the first substrate 97 is transferred to the heat dissipating portion 99 through a shortest distance by heat transfer. As a result, the first substrate 97 can obtain high heat dissipating efficiency.

In the surveillance camera 11, the substrate holding portion 95 has the connection hole 105 communicating with the rotation seat 19. The connection hole 105 is provided with the slip ring 83. The rotation seat 19 includes therein a second substrate 107 connected to the first substrate 97 via the slip ring 83. The heat dissipating portion 99 is provided on the outer peripheral side of the substrate holding portion 95 relative to the connection hole 105.

In the surveillance camera 11, the substrate holding portion 95 has the connection hole 105 communicating with the rotation seat 19. The connection hole 105 may be an inner hole of the cylindrical pan rotation shaft 79 provided at a central portion of the camera case 21. The pan rotation shaft 79 is rotatably supported by the rotation seat 19. Inside of the camera case 21 communicates with inside of the rotation seat 19 through the inner hole of the pan rotation shaft 79. The slip ring 83 is coaxially provided in the connection hole 105 of the pan rotation shaft 79.

On the other hand, the rotation seat 19 includes the second substrate 107. The second substrate performs additional processing such as combining and analyzing data transmitted from the first substrate and transmitting the data to an external device. The first substrate 97 provided in the camera case 21 performs processing of large size data such as a 4K image obtained by the camera unit 77 in advance to reduce (compress) a data size.

The camera case 21 supported by the rotation seat 19 in a pan-rotatable manner is endlessly rotated by the pan rotation shaft 79. The slip ring 83 is used in the surveillance camera 11 to eliminate restriction of a camera rotation angle due to winding of a harness.

The contact slip ring 83 includes rotation terminals and electrical contacts. The rotation terminals are fixed to an outer periphery of the slip rotation shaft, and are provided in a plurality of stages (for example, about 12 stages) in a direction along an axis of the slip rotation shaft. The electrical contacts are provided on a rotation seat side that does not rotate, and are in contact with respective rotation terminals. Accordingly, the surveillance camera 11 can transmit and receive an imaging signal or the like between the camera case 21 and the rotation seat 19 and can supply power to the camera case 21 and the rotation seat 19 while implementing endless rotation via the slip ring 83.

In the surveillance camera 11, deterioration of data quality occurred when large-sized data is transmitted through the contact slip ring 83 is reduced in advance by the first substrate 97 of the camera case 21 and then transmitted to the second substrate 107, thereby preventing the data deterioration.

In the surveillance camera 11, the heat dissipating portion 99 is provided on the outer peripheral side of the substrate holding portion 95 relative to the connection hole 105. Accordingly, in the surveillance camera 11, heat is less likely to be transferred to the slip ring 83. As a result, in the surveillance camera 11, a circuit of the slip ring 83 is less likely to be damaged and durability is improved.

In the surveillance camera 11, the heat dissipating portion 99 includes the plurality of heat dissipation plates 109 arranged at intervals between plate surfaces.

In the surveillance camera 11, the heat dissipating portion 99 is provided at the uppermost portion of the camera case 21. The heat dissipating portion 99 includes a plurality of heat dissipation plates 109 arranged at intervals between plate surfaces. That is, the heat dissipating portion 99 is a heat dissipation fin. The heat dissipation plates 109 are upright vertically from the horizontal outer side surface of the substrate holding portion 95, and a large number of heat dissipation plates 109 are arranged at relatively small gaps. That is, front and back surfaces of the heat dissipation plates 109 are along a vertical plane. Heat transferred from the uppermost portion of the substrate holding portion 95 to the heat dissipation plates 109 by heat transfer is transferred from the front and back surfaces to air in the heat dissipation space 101 by heat transfer due to a temperature difference from outside air. At this time, since the heat dissipation plates 109 are upright in the vertical direction, high-temperature air in the gaps between the adjacent heat dissipation plates 109 can quickly exchange heat by natural convection and escape from the gap. That is, high heat dissipating efficiency (in other words, cooling efficiency) can be implemented in a small space. The surveillance camera 11 can be made compact by obtaining high heat dissipating efficiency by the narrow heat dissipation space 101 provided between the rotation seat 19 and the camera case 21.

In the surveillance camera 11, the heat dissipation plates 109 extend outward from the center of the substrate holding portion 95.

In the surveillance camera 11, the heat dissipation plates 109 extend outward from the center of the substrate holding portion 95. The substrate holding portion 95 has the circular outer side surface in which the pan rotation shaft 79 is disposed in the center. That is, the heat dissipation plates 109 extend radially about the pan rotation shaft 79. As described above, the heat dissipation space 101 in which the heat dissipation plates 109 are provided is opened to the external space in the radial direction about the pan rotation shaft 79. The plurality of radially arranged heat dissipation plates 109 increase in distance between the adjacent radiation plates 109 toward a radially outer side. Accordingly, the surveillance camera 11 can smoothly introduce wind blowing from a lateral side of the heat dissipation space 101 deep between the heat dissipation plates and discharge the wind to the heat dissipation space 101. As a result, air between the heat dissipation plates can be quickly discharged, and good heat dissipation can be implemented.

Background to Third Embodiment

For example, JP2003-8954A discloses a dome-shaped surveillance camera apparatus including an infrared ray projecting unit configured to project an infrared ray and a camera configured to capture an image of an irradiation range of the infrared ray, in which a dome-shaped cover covering the infrared ray projecting unit and the camera is detachably attached to a base fixed to a ceiling, a wall, or the like. In the surveillance camera, the cover includes a case opened in a part covering the infrared ray projecting unit and a part covering the camera, and a transparent plate installed in the openings. A shield plate is erected on an inner side of the case and partitions the infrared ray projecting unit and the camera. A shield plate is further inserted into a slit having a prescribed length formed in the cover and partitions the infrared ray projecting unit and the camera.

Recently, a need for a surveillance camera has socially increased from a viewpoint of security or the like, and not only a surveillance camera including a large case in the related art but also a surveillance camera including a small case is demanded. As a size is reduced, a plurality of members are required to be disposed in a case. However, in a surveillance camera including a plurality of members at a high density in an accommodation space of a dome-shaped cover, a light shielding portion in a vicinity of the cover may be pressed when a foreign object collides with the cover, and the moved light shielding portion may come into contact with another member in the accommodation space and damages the other member. Further, if an LED is in a vicinity of the light shielding portion for a reduced size, the light shielding portion may be thermally deformed by heat generation of the LED.

Here, a third embodiment below describes an example of a surveillance camera in which a component is less likely to be damaged even when a light shielding portion comes into contact with the component, and the light shielding portion is less likely to be thermally deformed even when approaching an LED.

Third Embodiment

Hereinafter, the surveillance camera 11 according to the third embodiment will be described. In description of the surveillance camera 11 according to the third embodiment, the same reference numerals are given to configurations overlapping those of the surveillance camera 11 according to the first embodiment or the second embodiment, description thereof will be simplified or omitted, and different contents will be described.

Figure 19:
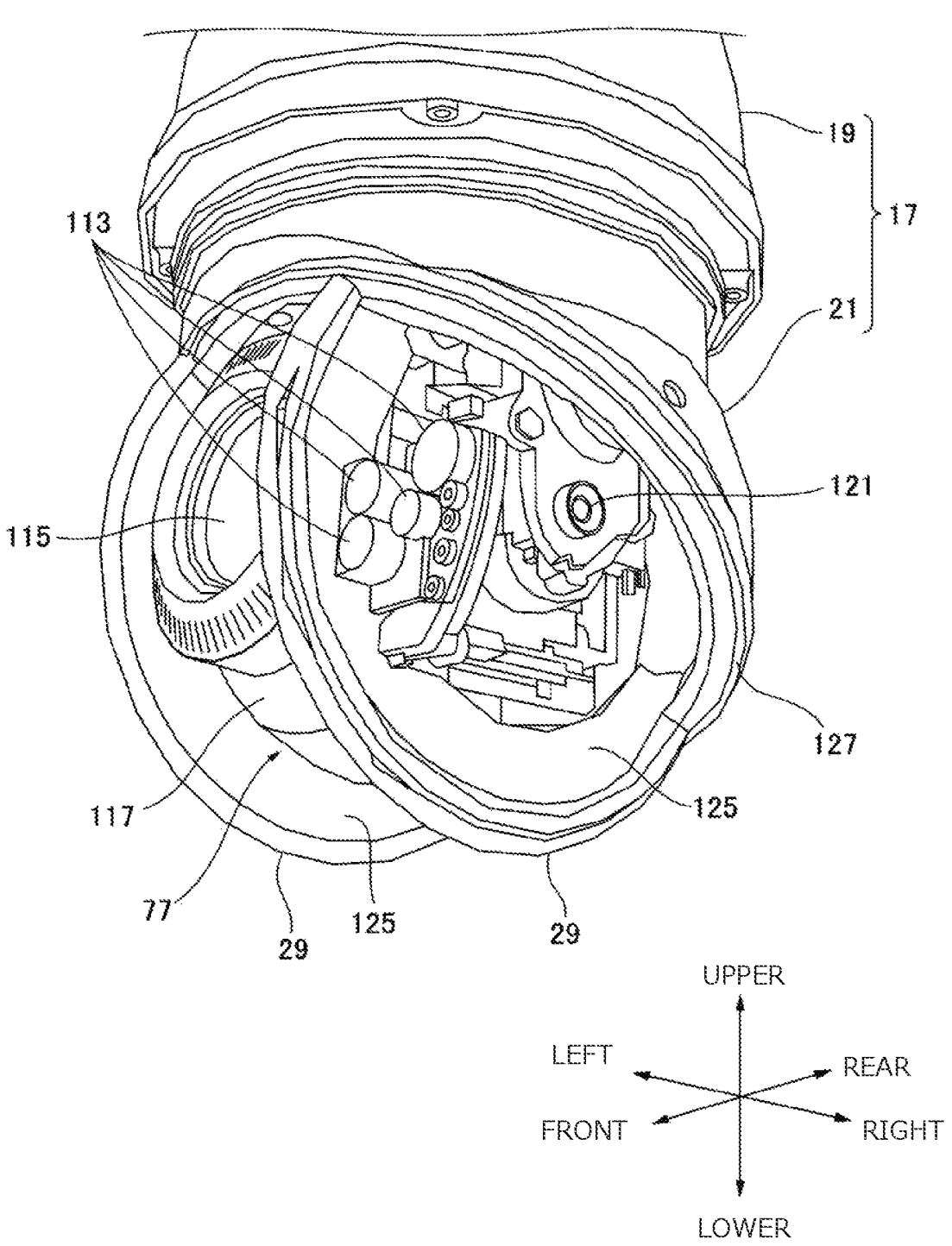
FIG. 19 is a perspective view of the case with a part of a cover omitted.

FIG. 19 is a perspective view of the main case 17 with a part of the cover 23 omitted. The surveillance camera 11 includes LEDs 113, the camera unit 77, and the cover 23 (see FIG. 9). The LEDs 113 project infrared light having a prescribed wavelength band so that the surveillance camera 11 installed in an outdoor environment or the like can capture an image even in a dark place at night or the like. A plurality of LEDs 113 constitute one set, and two sets of LEDs 113 are arranged on left and right sides with the camera unit 77 sandwiched in between. In each of the plurality of LEDs 113, for example, about three types of lens components having different heights and different sizes of intersecting surfaces perpendicular to an optical axis are arranged depending on an irradiation distance of infrared light. Specifically, the lens component having the largest height and the smallest area of the intersecting surface is arranged for far irradiation, the lens component having the medium height and the medium area of the intersecting surface is arranged for medium irradiation, and the lens component having the smallest height and the largest area of the intersecting surface is arranged for wide angle irradiation. For example, four LEDs 113 constitute one set. Types and the number of the LEDs 113 are not limited thereto.

The camera unit 77 includes a lens holding portion 117 that holds a lens 115. The camera unit 77 captures an image of an irradiation range of the infrared light projected by the LEDs 113. That is, the camera unit 77 can capture images at night. In the camera unit 77, the two sets of LEDs 113 described above are integrally fixed to a body portion 119. That is, the LEDs 113 rotate integrally with the camera unit 77 that is tilt-rotated about a tilt shaft 121.

The cover 23 covers the LEDs 113 and the camera unit 77. The cover 23 includes a plurality of members. The cover 23 is assembled into a dome shape as a whole as shown in FIG. 1. The dome shape has a substantially hemispherical surface. The cover 23 includes the imaging window portion 25 (see FIG. 1) at a center where imaging light is taken in, and the light projecting window portions 27 (see FIG. 1) that are disposed on two sides with the imaging window portion 25 sandwiched in between and cover the LEDs 113. That is, the window portions of the cover 23 are divided into three regions. In FIG. 19, the imaging window portion 25 and the light projecting window portions 27 are omitted.

Figure 20:
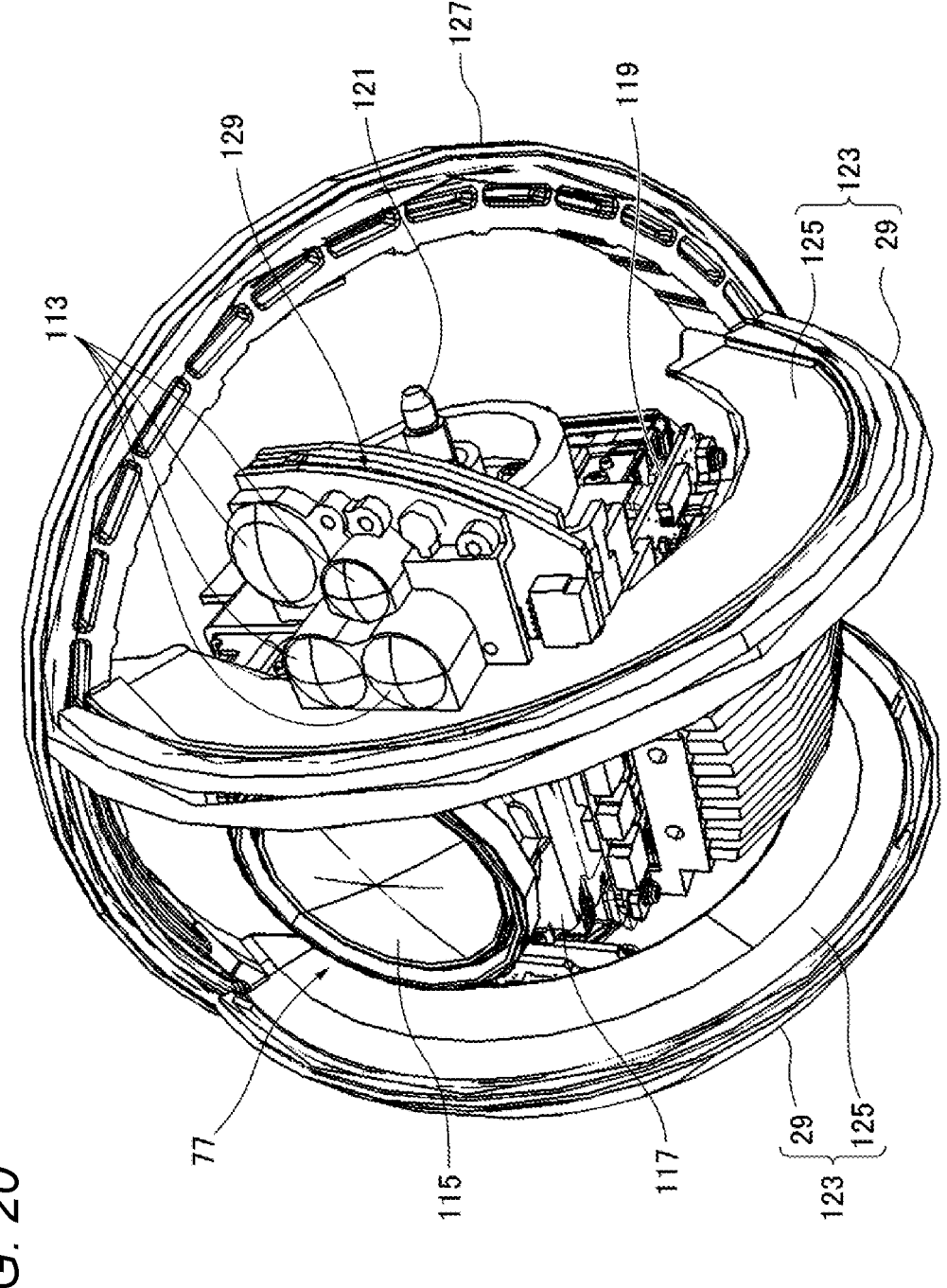
FIG. 20 is a perspective view of the camera covered with a cover in which a window portion is omitted.

FIG. 20 is a perspective view of the camera unit 77 covered with the cover 23 with the window portions omitted. The cover 23 includes light shielding portions 123. Each of the light shielding portions 123 includes a coupling body 29 coupled to the cover 23, and a light shielding plate 125 disposed between the camera unit 77 and the LEDs 113. The light shielding plates 125 are formed of a pair of arc-shaped plates that have left and right side portions of the camera unit 77 sandwiched in between from both sides. The pair of arc-shaped plates are disposed in parallel and separated, and both end portions of each of the pair of arc-shaped plates are fixed to a ring portion 127 in a bridged state. The ring portion 127 is integrally fixed to an opening of the dome-shaped cover 23. The camera unit 77 is disposed between the pair of separated arc-shaped plates.

On the other hand, the coupling body 29 is formed in an arc frame shape. A pair of coupling bodies 29 are provided corresponding to the pair of light shielding plates 125. The pair of coupling bodies 29 are parallel and both ends of each of the pair of coupling bodies 29 are fixed to the ring portion 127. That is, the coupling bodies 29 each have an arch shape and are bridged to the ring portion 127. In the cover 23, the imaging window portion 25 is disposed between the pair of coupling bodies 29. The light projecting window portions 27 are disposed between the respective coupling bodies 29 and the ring portion 127.

The light shielding plates 125, the coupling bodies 29, the ring portion 127, the imaging window portion 25, and the light projecting window portions 27 may be made of different materials. The cover 23 is integrally formed of these different materials. These different materials may be joined by an adhesive or welding. The joining may be performed by two-color molding. In the cover 23 formed of different materials in this manner, the ring portion 127 is water-tightly fixed to an opening of the camera case 21. The ring portion 127 and the light shielding plates 125 are fixed by outer end portions of the light shielding plates 125 being abutted against an inner peripheral side of the ring portion 127. End surfaces of the light shielding plates 125 extend toward the camera case 21 from a top end of the cover 23. That is, the light shielding plates 125 are longer than the cover 23, so that light from the LEDs 113 can be reliably shielded and prevented from entering the lens 115.

Here, the coupling bodies 29 integrally formed with the cover 23 face the light shielding plates 125, which are fixed to the cover 23 via the ring portion 127, along a dome curved surface with a slight gap. That is, in the light shielding portions 123, the coupling bodies 29 and the light shielding plates 125 are not in contact with each other. In the cover 23, the coupling bodies 29 are formed of a heat-resistant hard material, and the light shielding plates 125 are formed of a heat-resistant soft material having a light shielding property.

In following description of the third embodiment, the up-down, left-right, and front-rear directions are based on directions shown in FIG. 19. That is, with reference to the body portion 119, the ring portion 127 is disposed above the body portion 119, an opposite side of the ring portion 127 is disposed below the body portion 119, the left-right direction is a direction in which LED seats 129 of the body portion 119 extend, and the front-rear direction is a direction in which the LED seats 129 of the body portion 119 are not provided.

The camera unit 77 includes the body portion 119 and the lens holding portion 117 that is close to the cover 23 relative to the body portion 119 and holds the lens 115. At least top ends of the LEDs 113 are close to the cover 23 relative to the body portion 119 of the camera unit 77. The light shielding plates 125 are disposed between the lens holding portion 117 and the LEDs 113.

Figure 21:
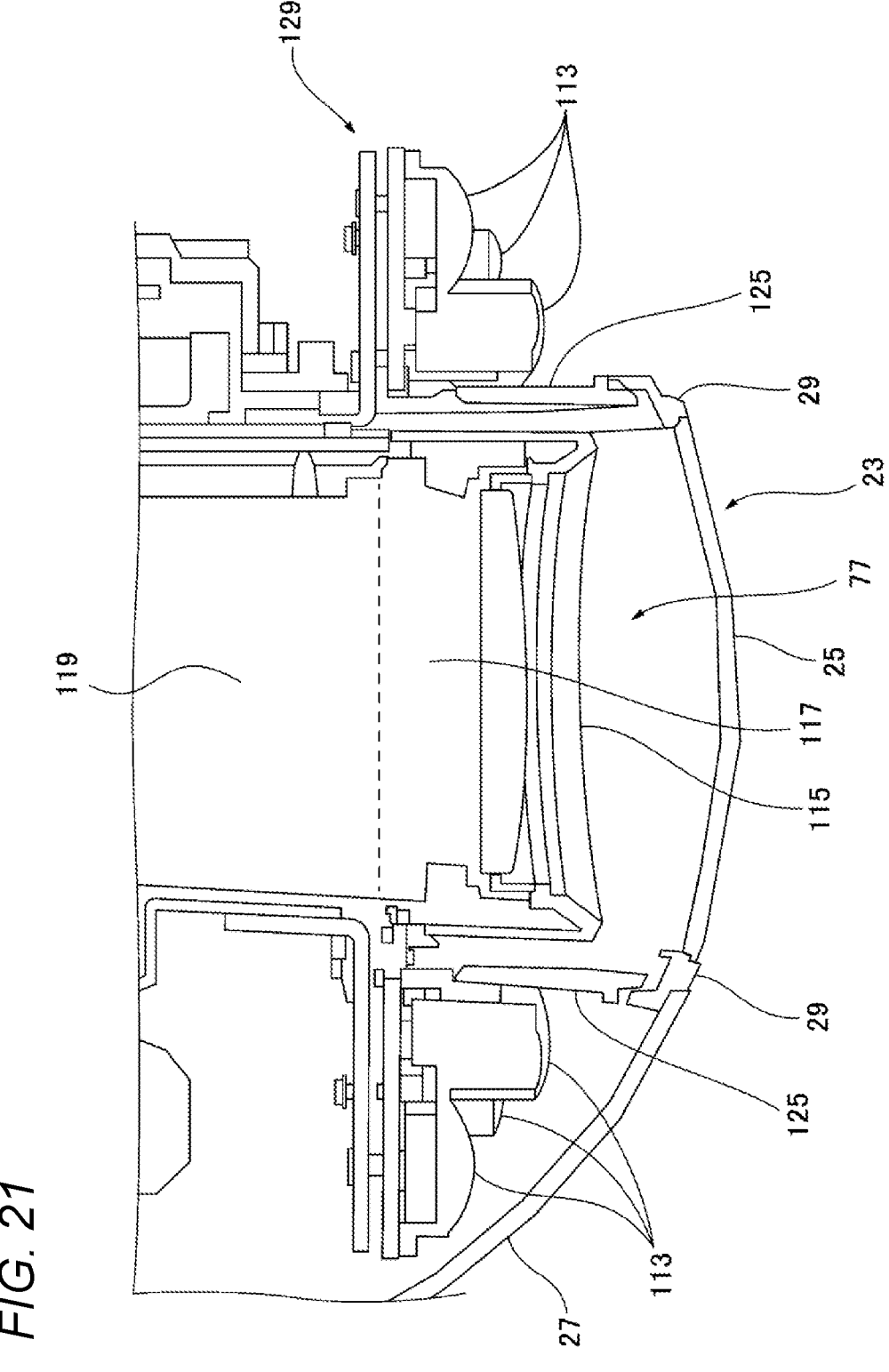
FIG. 21 is a sectional view of a main portion in a vicinity of a lens holding portion on a plane including a central axis of a lens.

FIG. 21 is a sectional view of a main portion in a vicinity of the lens holding portion 117 on a plane including the central axis 75 of the lens 115. The LEDs 113 are held by the LED seats 129 connected to the body portion 119. The LED seats 129 extend from left and right sides of the body portion 119. The LED seats 129 fix the LEDs 113 to an LED support surface facing the cover 23. In the example of FIG. 21, the left and right LED seats 129 have substantially the same height along the up-down direction, in other words, the two LED seats 129 are in the same position in the up-down direction as a boundary portion between the lens holding portion 117 and the body portion 119 (see a broken line in FIG. 21).

One of the left and right LED seats 129 may be disposed above the lens holding portion 117 (that is, away from the cover 23) relative to the other LED seat 129.

Figure 22:
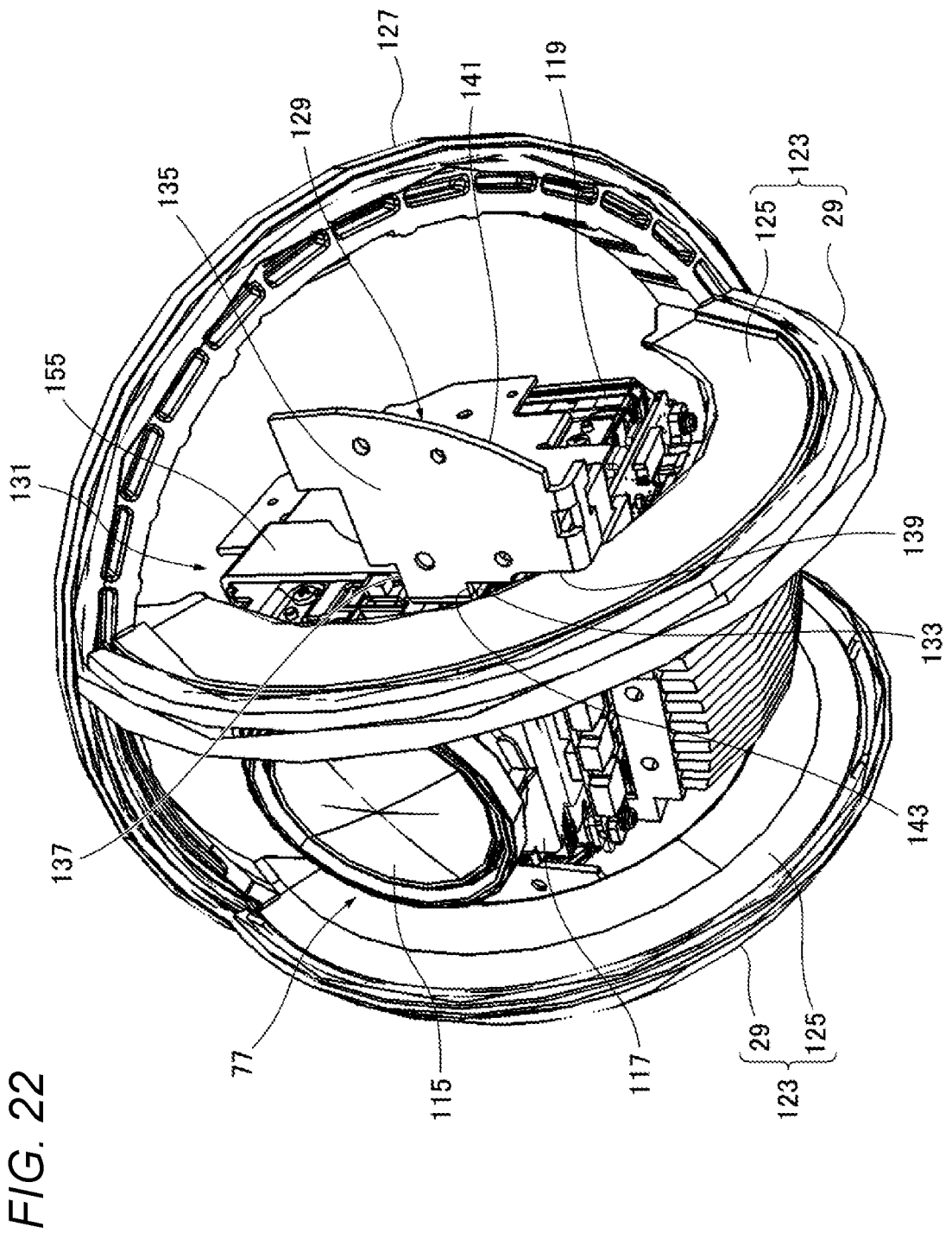
FIG. 22 is a perspective view in which an LED in FIG. 20 is omitted.

FIG. 22 is a perspective view in which the LEDs 113 in FIG. 20 are omitted. Each of the LED seats 129 has a side surface portion 131 provided along a side surface of the body portion 119. The LED seat 129 has an extending portion 133 (see FIGS. 23 and 25) extending from the side surface portion 131 toward the cover 23. The LED seat 129 has a support portion 135 that is connected to an end portion of the extending portion 133 on a cover 23 side and supports the LEDs 113. In the LED seat 129, the side surface portion 131, the extending portion 133, and the support portion 135 are integrally formed of a metal material (for example, copper or an aluminum alloy) having a high thermal conductivity.

Figure 23:
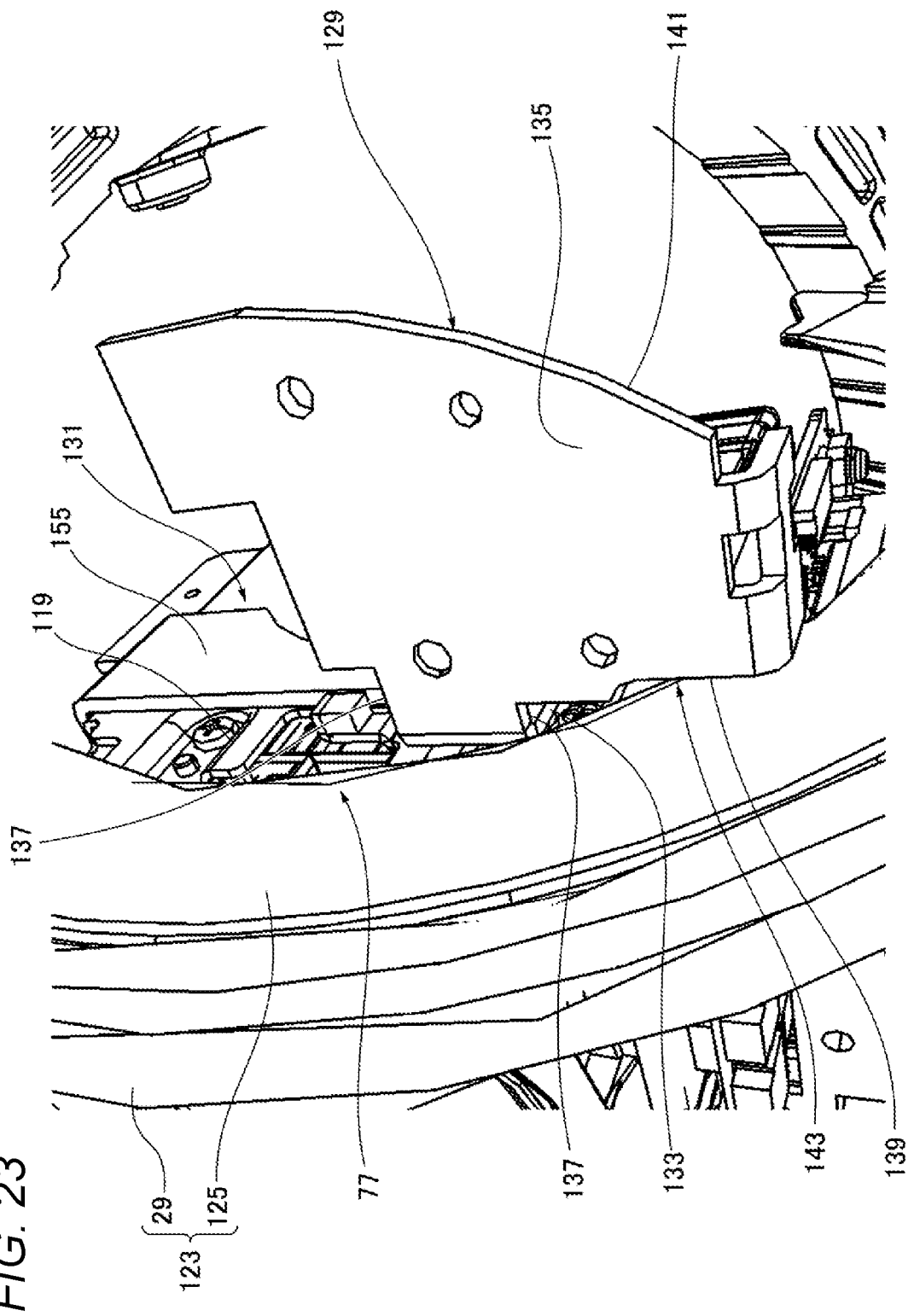
FIG. 23 is an enlarged perspective view of a main portion in a vicinity of a support portion.

FIG. 23 is an enlarged perspective view of a main portion in a vicinity of the support portion. The support portion 135 has a first side surface 137 that has one end connected to the end portion of the extending portion 133 on the cover 23 side and extends in a direction away from the camera unit 77. Further, the support portion 135 has a second side surface 139 that has one end connected to the other end of the first side surface 137 and extends along the camera unit 77. The support portion 135 has an arc-shaped curved outer shape 141. The support portion 135 is less likely to interfere with an inner surface of the cover 23 due to the curved outer shape 141 when rotating at the same time with the camera unit 77.

The light shielding plate 125 is disposed in a space defined by the camera unit 77, the first side surface 137, and the second side surface 139. The second side surface 139 may have a cutout portion 143 on the other end side relative to a center thereof. The camera unit 77 is tilt-rotatable in a high-density component layout without coming into contact with the light shielding plate 125 due to the cutout portion 143 and the space defined by the camera unit 77, the first side surface 137, and the second side surface 139.

Figure 24:
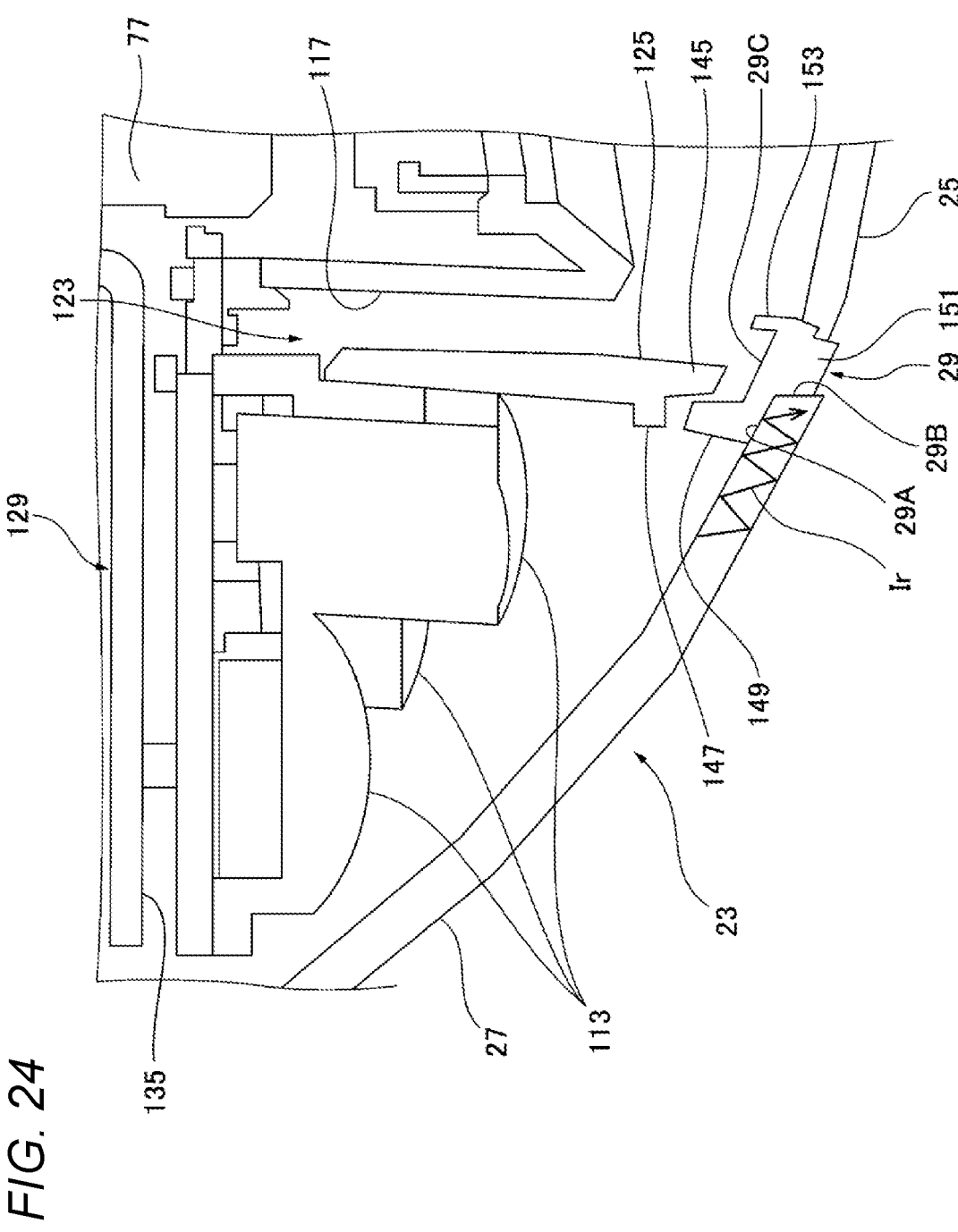
FIG. 24 is an enlarged view of a main portion of FIG. 21.

FIG. 24 is an enlarged view of a main portion of FIG. 21. In the LED seat 129, the support portion 135 extends to a side surface of the body portion 119 in the up-down direction to release heat of the LEDs 113 to a front surface of the camera. A part (particularly, the light shielding plate 125) of the light shielding portion 123 that is particularly accommodated between the LEDs 113 and the camera unit 77 (lens holding portion 117) is formed of a soft material.

The cover 23 has a three-piece structure. That is, the cover 23 includes one imaging window portion 25 and two light projecting window portions 27 with the imaging window portion 25 sandwiched in between. The imaging window portion 25 and the light projecting window portions 27 are partitioned by the coupling bodies 29. Accordingly, the cover 23 prevents light radiated from the LEDs 113 from entering the lens 115 through upper sides of the light shielding plates 125.

Light radiated from the LEDs 113 passes through the cover 23 and is radiated to an object. At this time, infrared light from the LEDs 113 may enter the lens 115. When infrared light enters the lens 115, following three cases are conceivable. The first approach path is a path going around from the upper sides of light shielding plates 125. The second approach path is a path along which light goes around from lower sides of the light shielding plates 125. The third approach path is a path along which light propagated through a medium of the light projecting window portions 27 is emitted from a medium of the imaging window portion 25 and enters the lens 115. In the surveillance camera 11, the first approach path is eliminated by bringing the light shielding plates 125 close to the LED seats 129.

In the surveillance camera 11, for the second approach path, a linear path through which light passes is blocked by the coupling bodies 29 and a light shielding piece provided on the light shielding plates 125. Specifically, each of the light shielding plates 125 includes a first light shielding piece 145 and a second light shielding piece 147. The first light shielding piece 145 protrudes close to the coupling body 29. The second light shielding piece 147 protrudes toward the LEDs. The coupling body 29 includes a third light shielding piece 149, a fourth light shielding piece 151, and a fifth light shielding piece 153. The third light shielding piece 149 protrudes toward the second light shielding piece 147. The fourth light shielding piece 151 is interposed between the light projecting window portion 27 and the imaging window portion 25 and shields continuity between the light projecting window portion 27 and the imaging window portion 25. The fifth light shielding piece 153 protrudes from the fourth light shielding piece 151 toward the camera and is located on an opposite side of the third light shielding piece 149 with the first light shielding piece 145 sandwiched in between.

In the cover 23, the first light shielding piece 145 faces the third light shielding piece 149 in the left-right direction. The third light shielding piece 149 faces the second light shielding piece 147 in the up-down direction. The second light shielding piece 147 blocks an upper side of a space between the first light shielding piece 145 and the third light shielding piece 149. A surface of the first light shielding piece 145 that is opposite to a surface thereof facing the third light shielding piece 149 faces the fifth light shielding piece 153. The fourth light shielding piece 151 prevents propagation of infrared light Ir that is totally reflected in the medium of the light projecting window portion 27 and enters the medium of the imaging window portion 25.

The coupling body 29 has a first side surface 29A that abuts against a side surface of the light projecting window portion 27, and a second side surface 29B that extends from the first side surface 29A toward the light projecting window portion 27 and abuts against a lower surface of the light projecting window portion 27. The coupling body 29 includes the third light shielding piece 149 extending upward from an end portion of the first side surface 29A. That is, the third light shielding piece 149 is close to the LEDs 113 relative to the first side surface 29A of the coupling body 29. The coupling body 29 has an upper surface 29C facing a lower end surface of the first light shielding piece 145. The first light shielding piece 145 is close to the body portion 119 relative to the third light shielding piece 149.

Figure 25:
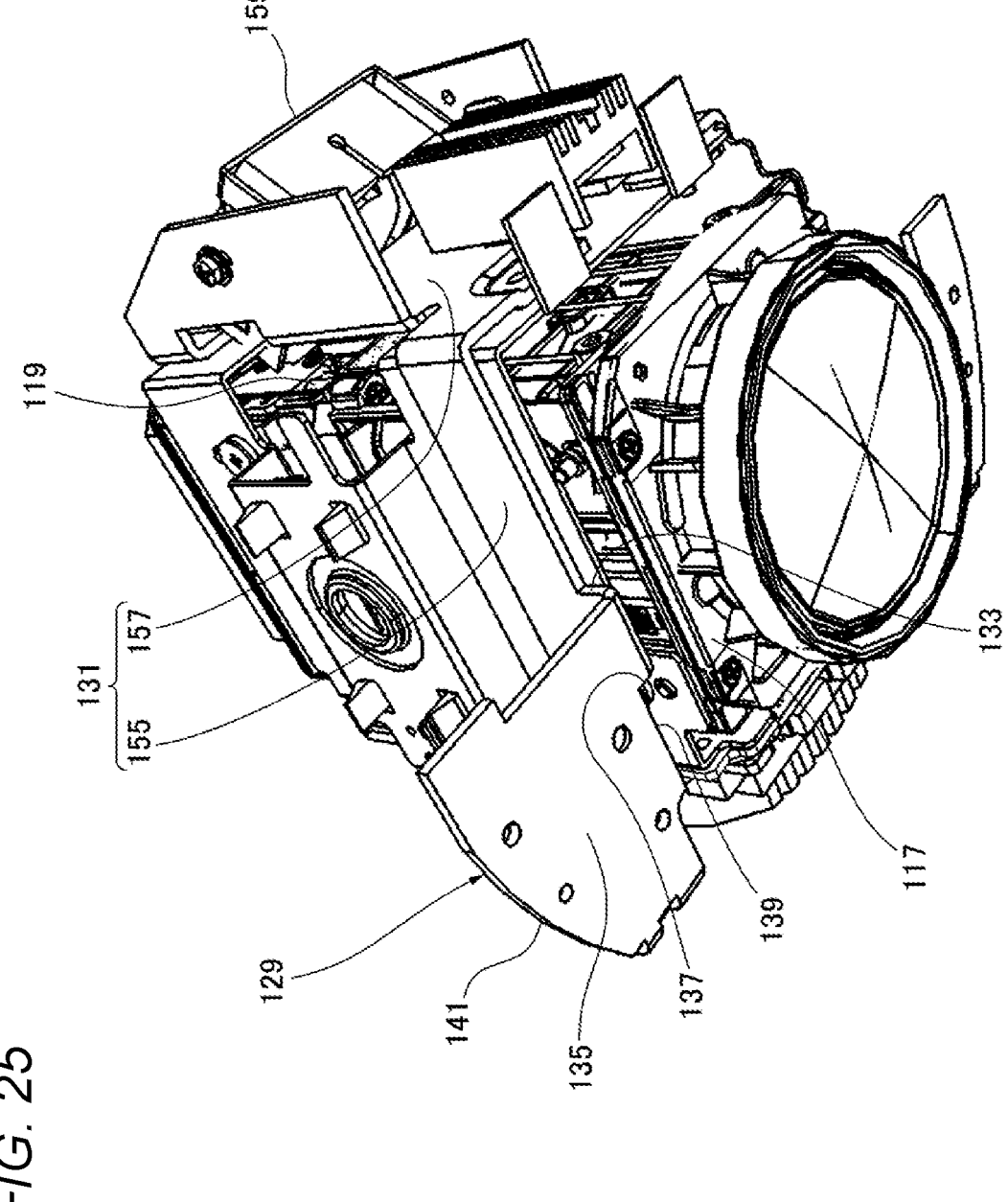
FIG. 25 is a perspective view of a body portion to which a side surface portion is attached.

FIG. 25 is a perspective view of the body portion 119 to which the side surface portion 131 is attached. The side surface portion 131 has a first side surface portion 155 provided on one side surface of the body portion 119 in the left-right direction. The side surface portion 131 has a second side surface portion 157 extending from an end portion of the first side surface portion 155 and provided on another side surface of the body portion 119 in the front-rear direction. A cooling device 159 that cools the second side surface portion 157 is provided in a vicinity of the second side surface portion 157. The cooling device 159 may also be provided on the second side surface portion 157, for example.

Next, operation of the third embodiment will be described.

The surveillance camera 11 includes a light emitting element (for example, the LEDs 113) that projects infrared light, the camera unit 77 that captures an image of an irradiation range of the infrared light projected by the light emitting element (for example, the LEDs 113), and the cover 23 that covers the light emitting element (for example, the LEDs 113) and the camera unit 77. The cover 23 includes light shielding portions 123. Each of the light shielding portions 123 includes a coupling body 29 coupled to the cover 23, and a light shielding plate 125 disposed between the camera unit 77 and the LEDs 113. The coupling body 29 is formed of a heat-resistant hard material. The light shielding plate 125 is formed of a soft material.

In the surveillance camera 11, since the light emitting element (for example, the LEDs 113) that projects infrared light is mounted, capturing images at night is possible. In the surveillance camera 11, the camera unit 77 and the LEDs 113 are covered with the cover 23. The LEDs 113 are close to the cover 23.

The cover 23 includes light shielding portions 123. Each of the light shielding portions 123 includes the coupling body 29 coupled to the cover 23, and the light shielding plate 125 separate from the coupling body 29 between the camera unit 77 and the LEDs 113. The coupling body 29 is made of a light shielding material, is formed in an arc shape along a dome curved surface of the cover 23, and is integrated with the cover 23. The coupling body 29 couples an imaging light transmission region and an infrared light transmission region of the cover 23.

On the other hand, the light shielding plates 125 are formed of a pair of arc-shaped plates that have the side portions of the camera unit 77 sandwiched in between from both sides. The pair of arc-shaped plates are disposed in parallel and separated, and both end portions of each of the pair of arc-shaped plates are fixed to a ring portion 127 in a bridged state. The ring portion 127 is integrally fixed to the opening of the dome-shaped cover 23. The camera unit 77 is disposed between the pair of separated arc-shaped plates.

The coupling body 29 integrally formed with the cover 23 faces the light shielding plate 125, which is fixed to the cover 23 via the ring portion 127, along the dome curved surface with a slight gap. That is, in the light shielding portion 123, the coupling body 29 and the light shielding plate 125 are not in contact with each other.

In the surveillance camera 11, since the coupling body 29 and the light shielding plate 125 are not in contact with each other, an impact applied from outside the cover 23 can be prevented from being directly applied to the light shielding plate 125. In the surveillance camera 11, since the coupling body 29 and the light shielding plate 125 of the cover 23 are not in contact with each other, flow of air along the inner surface of the cover 23 is made smooth, retention is prevented, and fogging or condensation is less likely to occur on the inner surface.

Since the surveillance camera 11 is assembled in a limited accommodation space for a reduced size, irradiation light from the LEDs 113 covered with the cover 23 easily and directly enters the camera unit 77 that is also covered with the cover 23. In the surveillance camera 11, the light shielding plate 125 partitions the LEDs 113 and the camera unit 77. The light shielding plate 125 is disposed with a slight gap from the coupling body 29 of the cover 23.

In the surveillance camera 11, when the cover 23 collides with an object, a protruding end portion of the light shielding plate 125 approaches the coupling body 29 of the cover 23. Accordingly, the light shielding plate 125 may be pressed against the cover 23, which is deformed on the inner side, and moves. In the surveillance camera 11, the light shielding plate 125 is formed of a soft material. Accordingly, in the surveillance camera 11, damage when the light shielding plate 125 comes into contact with another component is prevented. The soft material forming the light shielding plate 125 preferably has heat resistance.

In the surveillance camera 11, the light shielding portion 123 may be deformed by heat received from the LEDs 113. Here, a part of the light shielding portion 123 close to the cover 23, that is, the coupling body 29 and the protruding end portion of the light shielding plate 125 close to the coupling body 29, is preferably made of a heat-resistant hard material. As described above, the light shielding plate 125 is formed of a soft material to prevent damage when the light shielding plate 125 comes into contact with another component. For this reason, in the arc-shaped plate of the light shielding plate 125, the protruding end portion close to cover 23 may be formed of a heat-resistant hard material, and a concave end portion facing the component may be formed of a heat-resistant soft material. For example, two-color molding can be used to mold the same member with heterogeneous materials. As a result, in the surveillance camera 11, the component is less likely to be damaged even when the light shielding plate 125 comes into contact with the other component, and the light shielding portion 123 is less likely to be deformed even when approaching the LEDs 113. Accordingly, according to the surveillance camera 11, the component is less likely to be damaged even when the light shielding portion 123 comes into contact with the other component, and the light shielding portion 123 is less likely to be thermally deformed even when approaching the LEDs 113.

In the surveillance camera 11, the camera unit 77 includes the lens holding portion 117 that holds the lens 115 and the body portion 119. At least a top end of the light emitting element (for example, the LEDs 113) is close to the cover 23 relative to the body portion 119, and the light shielding portion 123 is disposed between the lens holding portion 117 and the light emitting element (for example, the LEDs 113).

In the surveillance camera 11, the camera unit 77 includes the lens holding portion 117 on the body portion 119. The LEDs 113 are close to the cover relative to the body portion 119. Accordingly, infrared light projected from the LEDs 113 is prevented from leaking inside the camera case 21 and becoming stray light.

In the surveillance camera 11, the light shielding portion 123 is further disposed between the lens holding portion 117 and the LEDs 113. Accordingly, infrared light projected from the LEDs 113 is shielded by the light shielding portion 123, and does not directly enter the lens 115 of the camera unit 77. As a result, in the camera unit 77, for example, deterioration in image quality due to excessive exposure during night imaging is prevented.

In the surveillance camera 11, the light emitting element (for example, the LEDs 113) is held by a light emitting element seat (for example, the LED seat 129) connected to the body portion 119. The light emitting element seat (for example, the LED seat 129) includes the side surface portion 131 provided along the side surface of the body portion 119, the extending portion 133 extending from the side surface portion 131 toward the cover 23, and the support portion 135 that is connected to the end portion of the extending portion 133 on the cover 23 side and supports the light emitting element (for example, the LEDs 113).

In the surveillance camera 11, the LEDs 113 are held by the LED seats 129. The LED seats 129 are connected to the body portion 119. Each of the LED seats 129 includes the side surface portion 131, the extending portion 133, and the support portion 135. The side surface portion 131 is provided along the side surface of the body portion 119 and is fixed to the body portion 119. The extending portion 133 extends from the side surface portion 131 toward the cover. The support portion 135 is connected to the end portion of the extending portion 133 on the cover side. The support portion 135 has the LED support surface perpendicular to an extending direction of the extending portion 133.

In the surveillance camera 11, the support portion 135 is provided, for example, in pairs. A pair of support portions 135 are provided on the left and right sides with the camera unit 77 sandwiched in between. That is, the pair of support portions 135 extend from the left and right sides of the body portion 119, and fix the LEDs 113 to the LED support surfaces of the support portions 135 that face an object. Since the LED seats 129 on which the LEDs 113 are mounted are connected to the body portion 119, the LED seats 129 rotate integrally with the camera unit 77 together with the tilt rotation of the camera unit 77. Accordingly, the LEDs 113 rotate at the same time with an imaging direction of the camera unit 77 rotated to a freely selected position, and can project infrared light.

In the surveillance camera 11, each of the support portions 135 has the first side surface 137 that has one end connected to the end portion of the extending portion 133 on the cover 23 side and extends in the direction away from the camera unit 77, and the second side surface 139 that has one end connected to the other end of the first side surface 137 and extends along the camera unit 77. The light shielding plate 125 is disposed in a space defined by the camera unit 77, the first side surface 137, and the second side surface 139.

According to the surveillance camera 11, for example, the pair of support portions 135 extend from the left and right sides of the camera unit 77. Each of the support portions 135 has the first side surface 137 that has one end connected to the end portion of the extending portion 133 on the cover 23 side and extends in the direction away from the camera unit 77, and the second side surface 139 that has one end connected to the other end of the first side surface 137 and extends along the camera unit 77. The light shielding plate 125 is disposed in a space defined by the camera unit 77, the first side surface 137, and the second side surface 139.

The pair of support portions 135 may be disposed outward of the light shielding plate 125 when the first side surface 137 extends from the body portion 119 in the direction away from the camera unit 77. That is, the first side surface 137 of the support portion 135 crosses the light shielding plate 125. Since the support portion 135 has the second side surface 139 extending along the camera unit 77 at an extending end of the first side surface 137, the support portion 135 is perpendicular to the central axis 75 of the lens 115 and serves as a surface material on which the LEDs 113 can be mounted.

When the LEDs 113 are mounted on the support portion 135, the space between the LEDs 113 and the lens holding portion 117 is blocked by the light shielding plate 125. When the LEDs 113 are close to the central axis 75 of the lens 115, a shadow can be prevented in the object. On the other hand, when the LEDs 113 are close to the lens 115, infrared light is likely to enter the lens 115 as stray light.

According to the surveillance camera 11, the support portions 135 are extended across the light shielding plates 125 from the camera unit 77 disposed between the pair of light shielding plates 125. Accordingly, a shadow of the object can be prevented in a high-density component layout and light can be prevented from entering the lens 115 as stray light.

In the surveillance camera 11, the side surface portion 131 has the first side surface portion 155 provided on one side surface of the body portion 119, and the second side surface portion 157 extending from the end portion of the first side surface portion 155 and provided on the other side surface of the body portion 119. The surveillance camera 11 further includes the cooling device 159 that cools the second side surface portion 157.

According to the surveillance camera 11, the LED seat 129 has the side surface portion 131 provided along the side surface of the body portion 119. The side surface portion 131 has the first side surface portion 155 provided on one side surface of the body portion 119, and the second side surface portion 157 extending from the end portion of the first side surface portion 155 and provided on the other side surface of the body portion 119. That is, the first side surface portion 155 and the second side surface portion 157 at least have an L shape. In an example in which the LED seat 129 includes a pair of parallel first side surface portions 155, the second side surface portion 157 connects end portions of the pair of first side surface portions 155 to each other. The pair of parallel first side surface portions 155 have the camera unit 77 sandwiched in between. From each of the pair of parallel first side surface portions 155, the support portion 135 extends in the direction away from the camera unit 77.

The cooling device 159 is provided on the second side surface portion 157. Examples of the cooling device 159 include a fan and an electronic cooling device.

When the cooling device 159 is driven, the second side surface portion 157 is cooled to a low temperature. On the other hand, the first side surface portion 155 connected to the second side surface portion 157 is connected to the support portion 135 via the extending portion 133. Since the LEDs 113 are provided on the support portion 135, the temperature of the support portion 135 is high due to the driving of the LEDs 113.

In the LED seat 129, a temperature difference occurs between the first side surface portion 155 having a high temperature due to heat generation of the LEDs 113 and the second side surface portion 157 having a low temperature due to the cooling device 159. Accordingly, heat transferred from the LEDs 113 to the first side surface portion 155 is transferred to the second side surface portion 157, and is smoothly discharged from the LED seat 129 to air in the camera case by the cooling device 159 provided in the second side surface portion 157.

In the surveillance camera 11, the cover 23 includes the imaging window portion 25 facing the camera unit 77 and the light projecting window portions 27 facing the LEDs 113. The coupling body 29 is disposed between the imaging window portion 25 and the light projecting window portions 27.

Accordingly, in the surveillance camera 11, infrared light from the LEDs 113 is easily shielded between the imaging window portion 25 and the light projecting window portions 27 by the coupling body 29. That is, infrared light from the LEDs 113 is prevented from passing through the imaging window portion 25 and entering the lens 115.

In the surveillance camera 11, a gap is formed between the coupling body 29 and the light shielding plate 125. The light shielding plate 125 includes the first light shielding piece 145 extending toward the coupling body 29. The coupling body 29 includes the second light shielding piece (third light shielding piece 149) extending toward the light shielding plate 125. The first light shielding piece faces the second light shielding piece.

Accordingly, in the surveillance camera 11, even when a gap is provided between the coupling body 29 and the light shielding plate 125 to avoid contact between the light shielding portion 123 and the cover 23, infrared light from the LEDs 113 is less likely to enter the lens 115 due to the first light shielding piece 145 of the light shielding plate 125 and the second light shielding piece (that is, the third light shielding piece 149) of the coupling body 29.

In the surveillance camera 11, the coupling body 29 has the first side surface 29A that abuts against the side surface of the light projecting window portion 27 and the second side surface 29B that abuts against the surface of the light projecting window portion 27 on the LED 113 side.

Accordingly, in the surveillance camera 11, the coupling body 29 abuts against both the side surface and the surface on the LED 113 side of the light projecting window portion 27, and thus infrared light from the LEDs 113 is less likely to enter the lens 115.

Although various embodiments have been described above with reference to the accompanying drawings, the present disclosure is not limited to such examples. It is apparent to a person skilled in the art that various changes, corrections, substitutions, additions, deletions, and equivalents can be conceived within the scope of the claims, and it is understood that such modifications also belong to the technical scope of the present disclosure. Components in the above described various embodiments may be freely combined without departing from the gist of the invention.

INDUSTRIAL APPLICABILITY

The present disclosure is useful for a surveillance camera that can properly dissipate heat to outside even when a substrate generates heat.

What is claimed is:

1. A surveillance camera comprising:
a camera;
a camera case including the camera therein;
a rotation seat rotatably connecting the camera case;
a pan rotation shaft pan-rotatably supported relative to the rotation seat, wherein
the camera case includes a substrate holder formed of metal,
on an inner side surface of the substrate holder, a first substrate on which an electronic component that processes data transmitted from the camera is mounted is arranged,
on an outer side surface of the substrate holder, a heat dissipator is formed, and
the first substrate and the heat dissipator are arranged on an outer periphery of the pan rotation shaft.

2. The surveillance camera according to claim 1, wherein the rotation seat faces the outer side surface of the substrate holder, and
a heat dissipation space is provided between the rotation seat and the outer side surface of the substrate holder.

3. The surveillance camera according to claim 2, wherein the heat dissipation space communicates with an external space.

4. The surveillance camera according to claim 1, wherein the heat dissipator is continuous with a substrate fixing surface of the substrate holder on which the first substrate is disposed.

5. The surveillance camera according to claim 4, wherein the substrate holder has a connection hole communicating with the rotation seat,
the connection hole is provided with a slip ring therein,
a second substrate is arranged inside the rotation seat, and is connected to the first substrate via the slip ring, and
the heat dissipator is provided on an outer peripheral side of the substrate holder relative to the connection hole.

6. The surveillance camera according to claim 1, wherein the heat dissipator includes a plurality of heat dissipation plates arranged at intervals between plate surfaces.

7. The surveillance camera according to claim 6, wherein the heat dissipation plates extend outward from a center of the substrate holder.

8. The surveillance camera according to claim 3, wherein the heat dissipation space is provided between the camera case and the rotation seat, and has a circular plate shape.

9. The surveillance camera according to claim 1, wherein a gap is provided between the outer periphery of the pan rotation shaft and an inner side of the heat dissipator.

10. A surveillance camera comprising:
a camera;
a camera case including the camera therein and further including a metal substrate holder; and
a rotation seat rotatably connecting the camera case, wherein
on an inner side surface of the substrate holder, a first substrate on which an electronic component that processes data transmitted from the camera is mounted is arranged,
on an outer side surface of the substrate holder, a heat dissipator is formed,
the heat dissipator is continuous with a substrate fixing surface of the substrate holder on which the first substrate is disposed,
the substrate holder has a connection hole communicating with the rotation seat,
the connection hole is provided with a slip ring therein,
a second substrate is arranged inside the rotation seat, and is connected to the first substrate via the slip ring, and
the heat dissipator is provided on an outer peripheral side of the substrate holder relative to the connection hole.

* * * * *